(12) United States Patent
    Awazu et al.

(10) Patent No.: US 11,064,121 B2
(45) Date of Patent: Jul. 13, 2021

(54) IMAGE SHAKE CORRECTION DEVICE IINCLUDING ADJUSTMENT MEMBERS THAT ADJUST THE POSITION OF A MOVABLE MEMBER

(71) Applicant: FUJIFILM Corporation, Tokyo (JP)

(72) Inventors: Kouhei Awazu, Saitama (JP); Yasuhiro Miwa, Saitama (JP); Hajime Fukushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/831,252

(22) Filed: Mar. 26, 2020

(65) Prior Publication Data

US 2020/0228710 A1     Jul. 16, 2020

Related U.S. Application Data

(63) Continuation of application No. PCT/JP2018/036055, filed on Sep. 27, 2018.

(30) Foreign Application Priority Data

Sep. 27, 2017   (JP) .............................. JP2017-186873

(51) Int. Cl.
    *H04N 5/228*    (2006.01)
    *H04N 5/232*    (2006.01)
    *H04N 5/225*    (2006.01)

(52) U.S. Cl.
    CPC ....... *H04N 5/23287* (2013.01); *H04N 5/2253* (2013.01); *H04N 5/23258* (2013.01)

(58) Field of Classification Search
    CPC ............. H04N 5/23287; H04N 5/2253; H04N 5/23258

(Continued)

(56) References Cited

U.S. PATENT DOCUMENTS

2005/0264656 A1* 12/2005 Seo ..................... H04N 5/2253
                                                                  348/219.1
2008/0048652 A1    2/2008 Murakita
(Continued)

FOREIGN PATENT DOCUMENTS

CN      101354517 A    1/2009
CN      101964871 A    2/2011
(Continued)

OTHER PUBLICATIONS

International Search Report issued in PCT/JP2018/036055; dated Nov. 20, 2018.
(Continued)

*Primary Examiner* — Usman A Khan
(74) *Attorney, Agent, or Firm* — Studebaker & Brackett PC

(57) ABSTRACT

An image shake correction device includes: a movable member; a support member that supports the movable member to be movable in a plurality of directions along a flat surface; a circuit board that is fixed to the movable member; an imager that is mounted on the circuit board; a plurality of position detectors that is fixed to a rear surface of the circuit board opposite to a surface of the circuit board on which the imager is mounted to detect a position of the movable member in a movement direction of the movable member; magnetic force generators that face the plurality of position detectors respectively and are fixed to the support member; and adjustment members that adjust distances between the magnetic force generators and the support member.

9 Claims, 18 Drawing Sheets

(58) Field of Classification Search
USPC ...................................................... 348/208.2
See application file for complete search history.

(56) References Cited

U.S. PATENT DOCUMENTS

| | | |
|---|---|---|
| 2009/0027506 A1 | 1/2009 | Kobayashi et al. |
| 2009/0225176 A1* | 9/2009 | Honjo .................. G02B 27/646 |
| | | 348/208.99 |
| 2011/0019075 A1 | 1/2011 | Chiang |
| 2015/0212337 A1 | 7/2015 | Nomura et al. |
| 2015/0215541 A1 | 7/2015 | Nomura et al. |
| 2015/0215542 A1 | 7/2015 | Nomura et al. |
| 2016/0050373 A1 | 2/2016 | Nakamura |

FOREIGN PATENT DOCUMENTS

| | | |
|---|---|---|
| CN | 104865774 A | 8/2015 |
| CN | 107102494 A | 8/2017 |
| CN | 209180600 U | 7/2019 |
| JP | 2004-054180 A | 2/2004 |
| JP | 2007-310302 A | 11/2007 |
| JP | 2008-020704 A | 1/2008 |
| JP | 2016-042146 A | 3/2016 |
| JP | 2016-184132 A | 10/2016 |
| JP | 2017-058169 A | 3/2017 |

OTHER PUBLICATIONS

Written Opinion issued in PCT/JP2018/036055; dated Nov. 20, 2018.

An Office Action mailed by China National Intellectual Property Administration dated Nov. 26, 2020, which corresponds to Chinese Patent Application No. 201880062583.7 and is related to U.S. Appl. No. 16/831,252; with English language translation.

* cited by examiner

IMAGE SHAKE CORRECTION DEVICE IINCLUDING ADJUSTMENT MEMBERS THAT ADJUST THE POSITION OF A MOVABLE MEMBER

CROSS REFERENCE TO RELATED APPLICATION

This is a continuation of International Application No. PCT/JP2018/036055 filed on Sep. 27, 2018, and claims priority from Japanese Patent Application No. 2017-186873 filed on Sep. 27, 2017, the entire disclosures of which are incorporated herein by reference.

BACKGROUND OF THE INVENTION

1. Field of the Invention

The present invention relates to an image shake correction device, an imaging device, and a method of manufacturing an image shake correction device.

2. Description of the Related Art

An imaging device comprising an imager that images a subject through an imaging optical system or a lens device used by being attached to the imaging device has an image shake correction function of correcting shake (hereinafter, referred to as image shake) of a captured image caused by vibration of the apparatus.

For example, in the lens device, image shake correction is performed by moving a correction lens included in an imaging optical system in a surface perpendicular to an optical axis such that the vibration of the apparatus is detected based on information from a motion detection sensor such as an acceleration sensor or angular velocity sensor mounted on the lens device and the detected vibration is canceled.

In the imaging device, the image shake correction is performed by moving one or both of the correction lens included in the imaging optical system and the imager on a surface perpendicular to an optical axis such that the vibration of the apparatus is detected based on information from a motion detection sensor such as an acceleration sensor or an angular velocity sensor mounted on the imaging device and the detected vibration is canceled.

JP2008-020704A describes an image shake correction device that performs image shake correction by moving a circuit board on which an imager is mounted.

This image shake correction device includes a mechanism for adjusting a positional deviation (a positional deviation of the circuit board in a movement direction) between a Hall element for detecting a position of the circuit board and a magnet facing the Hall element. Position detection accuracy is improved by correcting the positional deviation by using this mechanism.

JP2016-042146A describes an image shake correction device that performs image shake correction by moving a lens.

This image shake correction device includes a voice coil motor for driving the lens, and a mechanism for adjusting a distance between a coil and a magnet constituting the voice coil motor. By this mechanism, lens drive performance is improved by adjusting the distance between the coil and the magnet.

SUMMARY OF THE INVENTION

As described in JP2008-020704A, in a case where the image shake is corrected by moving a movable member including the circuit board on which the imager is mounted, position detectors for detecting the position of the movable member and drive coils for moving the movable member are arranged on a flat surface portion of the movable member.

However, in a case where the position detector and the drive coil are close to each other, the position detection accuracy of the position detector is likely to be reduced due to the influence of the magnetic field of the magnet facing the drive coil.

Therefore, it is conceivable to provide the position detector on a rear surface of the circuit board opposite to a mounting surface of the imager. According to this configuration, distances between the position detectors and the drive coils can be sufficiently ensured.

In a case where the position detectors are provided on the rear surface of the circuit board, a fixing member in which magnets are provided at positions facing the position detectors needs to be disposed on the rear surface of the circuit board.

The imager comprises a semiconductor chip including a light receiving surface and a package that accommodates the semiconductor chip. In order to perform accurate image shake correction, the light receiving surface of the imager needs to be parallel to the flat surface on which the movable member is moved.

Meanwhile, the light receiving surface of the imager and the rear surface of the circuit board on which the imager is mounted may not be parallel due to a manufacturing error in a case where the package is mounted on the circuit board, a manufacturing error in a case where the semiconductor chip is fixed to the package, or a tolerance of the package itself.

Therefore, in a case where a posture of the circuit board with respect to the movable member is adjusted such that the light receiving surface of the imager is parallel to the flat surface on which the movable member is moved, the rear surface of the circuit board is inclined with respect to the flat surface on which the movable member is moved.

As a result, the distances between the position detectors fixed to the rear surface of the circuit board and the position detection magnets fixed to the fixing member are not uniformized.

As described above, in a case where the distances between the position detectors and the position detection magnets are not uniformized, the position detection accuracy is lowered.

JP2008-020704A discloses a technology capable of adjusting the position of the position detector in the movement direction of the movable member, and does not consider the position detection accuracy due to changes of the distances between the plurality of position detectors and the magnets.

JP2016-042146A discloses a technology for correcting the image shake by driving the lens, and does not recognize the aforementioned problem in a case where the position detectors are fixed to the circuit board on which the imager is mounted and the image shake correction is performed by moving the circuit board.

The present invention has been made in view of the above circumstances, and an object of the present invention is to provide an image shake correction device capable of improving correction accuracy of image shake by improving position detection accuracy of an imager in a case where the image shake is corrected by moving the imager, an imaging device comprising the image shake correction device, and a method of manufacturing the image shake correction device.

The present invention provides an image shake correction device comprising a movable member, a support member that supports the movable member to be movable in a plurality of directions along a flat surface, a circuit board that is fixed to the movable member, an imager that is mounted on the circuit board, a plurality of position detectors that is fixed to a rear surface of the circuit board opposite to a surface of the circuit board on which the imager is mounted to detect a position of the movable member in a movement direction of the movable member, magnetic force generators that face the plurality of position detectors respectively and are fixed to the support member, and adjustment members that adjust distances between the magnetic force generators and the support member.

The present invention provides an imaging device comprising the image shake correction device.

The present invention provides a method of manufacturing an image shake correction device that includes a movable member, a support member which supports the movable member to be movable in a plurality of directions along a flat surface, a circuit board which is fixed to the movable member, an imager which is mounted on the circuit board, a plurality of position detectors which is fixed to a rear surface of the circuit board opposite to a surface of the circuit board on which the imager is mounted to detect a position of the movable member in a movement direction of the movable member, and magnetic force generators which face the plurality of position detectors respectively and are fixed to the support member. The method comprises a first step of fixing the circuit board to the movable member in a state in which a light receiving surface of the imager is parallel to the flat surface, and a second step of adjusting distances between the magnetic force generators and the support member, and fixing the magnetic force generators to the support member in a state in which the adjusted distances are maintained after the first step.

According to the present invention, it is possible to provide an image shake correction device capable of improving correction accuracy of image shake by improving position detection accuracy of an imager in a case where the image shake by moving the imager, an imaging device comprising the image shake correction device, and a method of manufacturing the image shake correction device.

DESCRIPTION OF THE PREFERRED EMBODIMENTS

Hereinafter, embodiments of the present invention will be described with reference to the drawings.

Figure 1:
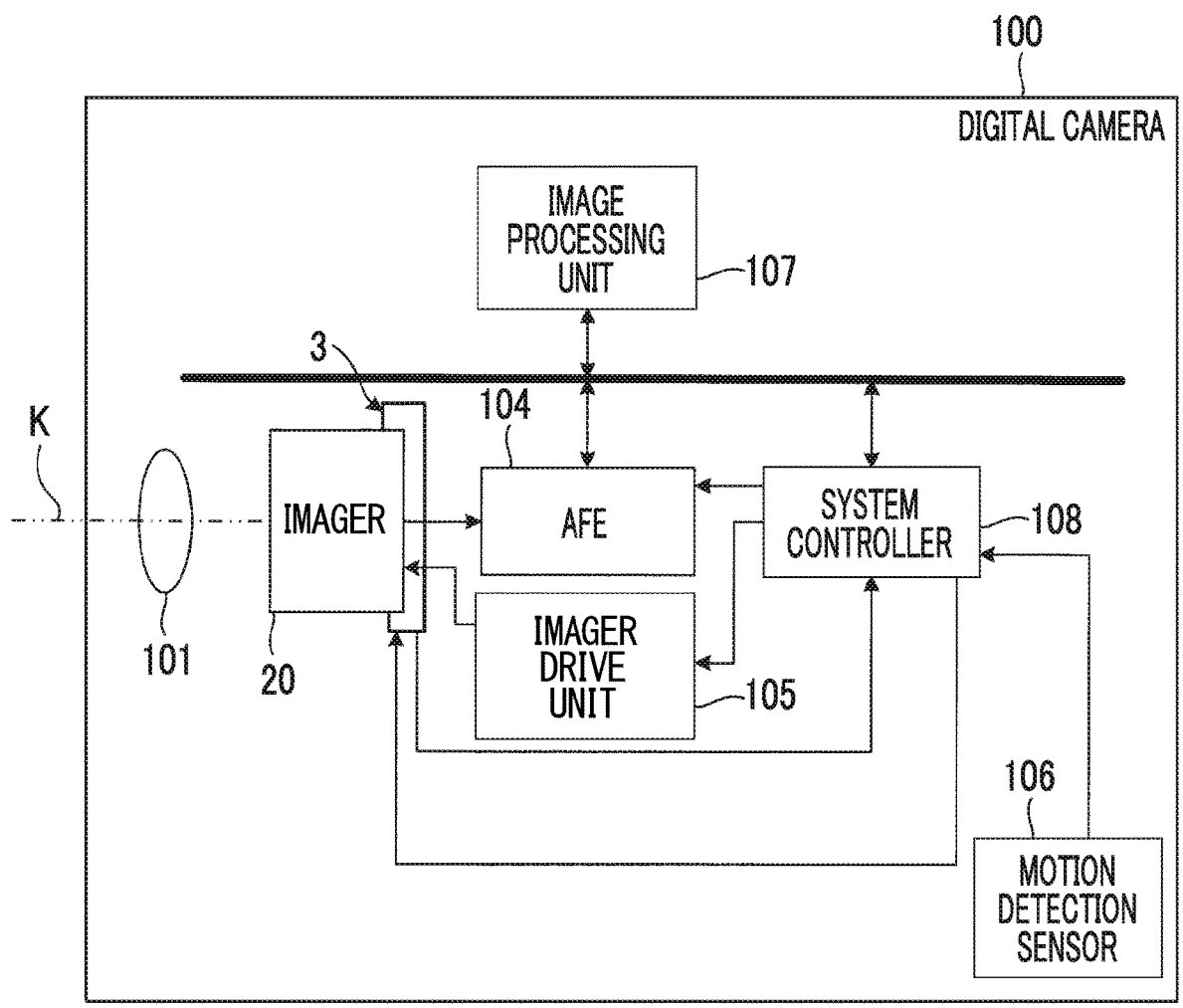
FIG. 1 is a diagram showing a schematic configuration of a digital camera 100 which is an embodiment of an imaging device of the present invention.

FIG. 1 is a diagram showing a schematic configuration of a digital camera 100 which is an embodiment of an imaging device of the present invention.

The digital camera 100 comprises an imaging optical system 101, an imager 20, an image shake correction device 3, an imager drive unit 105 that drives the imager 20, an analog front end (AFE) 104, an image processing unit 107, a motion detection sensor 106, and a system controller 108 that performs overall control of the entire digital camera 100.

The imaging optical system 101 includes a focus lens or a zoom lens, and a stop.

The imager 20 images a subject through the imaging optical system 101, and comprises a semiconductor chip on which a charge coupled device (CCD) image sensor or a complementary metal oxide semiconductor (CMOS) image sensor is formed and a package that accommodates the semiconductor chip.

Figure 3:
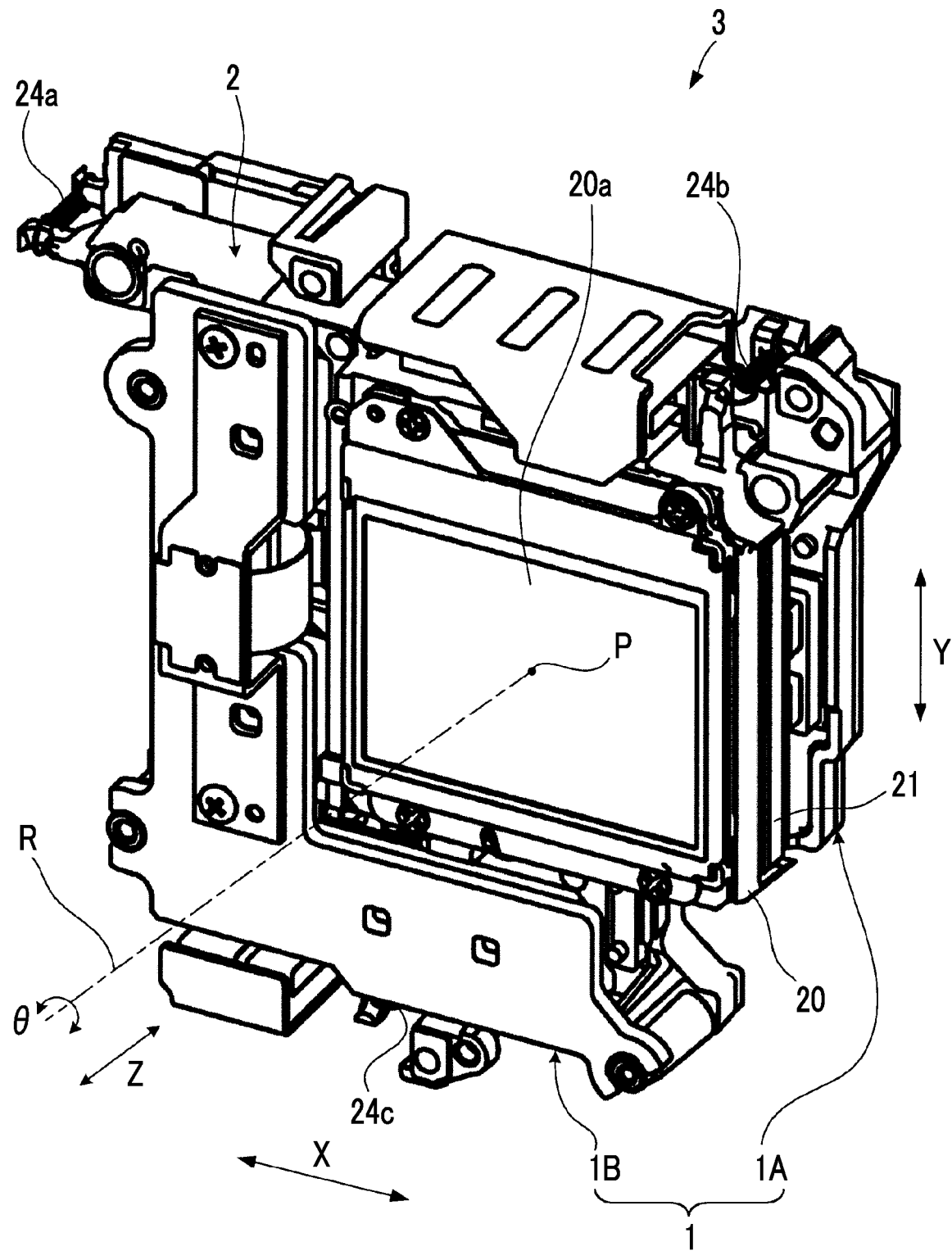
FIG. 3 is a perspective view showing an appearance configuration of the image shake correction device 3 shown in FIGS. 1 and 2.

As shown in FIG. 3 to be described below, a light receiving surface 20a of the imager 20 has a rectangular shape.

The image shake correction device 3 corrects image shake of a captured image captured by the imager 20 by moving the light receiving surface 20a of the imager 20 within a surface perpendicular to an optical axis K of the imaging optical system 101.

In the present specification, in the digital camera 100, the light receiving surface 20a of the imager 20 is perpendicular to a gravity direction (the optical axis K is parallel to the gravity direction), and a state in which the image shake correction device 3 is not energized is a reference state. In this reference state, a center P (see FIG. 3) of the light receiving surface 20a is located on the optical axis K.

Although the detailed configuration of the image shake correction device 3 will be described below, the image shake is corrected by moving the imager 20 in three directions of a first direction which is a longitudinal direction (direction X shown in FIG. 3) of the light receiving surface 20a of the imager 20 in the reference state, a second direction which is a short direction (direction Y shown in FIG. 3) of the light receiving surface 20a of the imager 20 in the reference state, and a third direction which is a direction (direction θ shown in FIG. 3) along a circumference of a circle whose center is the center P of the light receiving surface 20a of the imager 20 in this reference state.

The AFE 104 includes a signal processing circuit that performs correlative double sampling processing and digital conversion processing on imaging signals output from the imager 20.

The image processing unit 107 performs digital signal processing on the imaging signals processed by the AFE 104, and generates captured image data such as a Joint Photographic Experts Group (JPEG) format.

The motion detection sensor 106 is a sensor that detects the movement of the digital camera 100, and includes an acceleration sensor, an angular velocity sensor, or both thereof.

The system controller 108 controls the imager drive unit 105 and the AFE 104 such that the subject is captured by the imager 20 and the imaging signal corresponding to a subject image is output from the imager 20.

The system controller 108 controls the image shake correction device 3 based on movement information of the digital camera 100 detected by the motion detection sensor 106.

The system controller 108 corrects the image shake of the captured image captured by the imager 20 by moving the light receiving surface 20a of the imager 20 in at least one of the direction X, the direction Y, and the direction θ.

In a state in which the image shake correction device 3 is energized, in a case where the movement of the digital camera 100 is not detected by the motion detection sensor 106, the system controller 108 controls the image shake correction device 3 such that a position of the light receiving surface 20a of the imager 20 is a position in the reference state.

Figure 2:
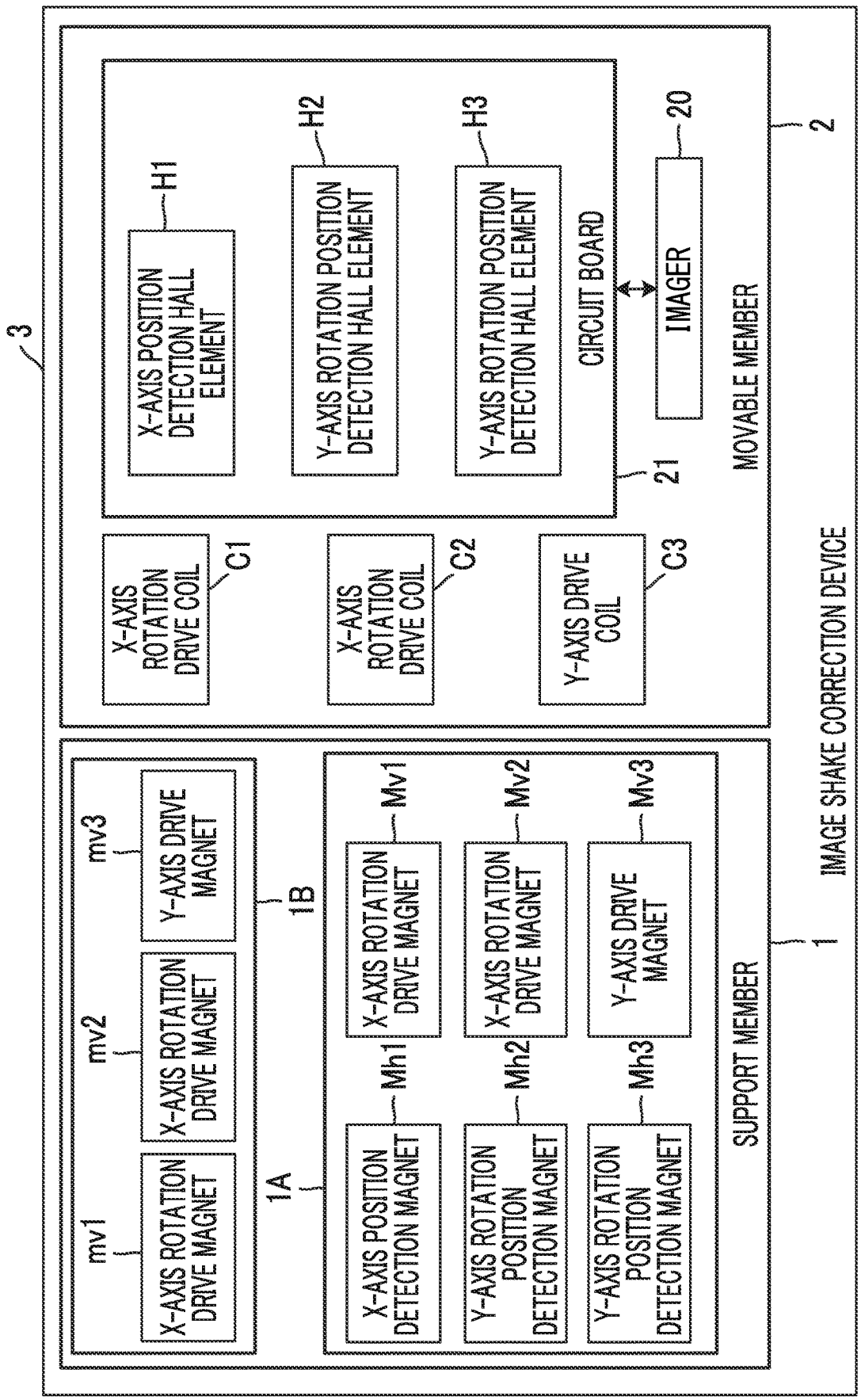
FIG. 2 is a diagram showing a schematic configuration of an image shake correction device 3 in the digital camera 100 shown in FIG. 1.

FIG. 2 is a diagram showing a schematic configuration of the image shake correction device 3 in the digital camera 100 shown in FIG. 1.

The image shake correction device 3 comprises a movable member 2 movable in each of the directions X, Y, and θ, and a support member 1 that supports the movable member 2 to be movable in each of the directions X, Y, and θ.

A circuit board 21 on which the imager 20 is fixed (mounted), an X-axis rotation drive coil C1, an X-axis rotation drive coil C2, and a Y-axis drive coil C3 are fixed to the movable member 2.

An X-axis position detection Hall element H1 that is a position detector for detecting a position of the movable member 2 in the direction X, and a Y-axis rotational position detection Hall element H2 and a Y-axis rotation position detection Hall element H3 which are position detectors for detecting positions of the movable member 2 in the direction Y and the direction θ are fixed to the circuit board 21.

Hereinafter, the X-axis position detection Hall element H1, the Y-axis rotation position detection Hall element H2, and the Y-axis rotation position detection Hall element H3 are collectively referred to as the position detectors.

Output signals of the X-axis position detection Hall element H1, the Y-axis rotation position detection Hall element H2, and the Y-axis rotation position detection Hall element H3 are input to the system controller 108.

The system controller 108 moves the movable member 2 by controlling a control current flowing through the X-axis rotation drive coil C1, a control current flowing through the X-axis rotation drive coil C2, and a control current flowing through the Y-axis drive coil C3 based on the output signals, and corrects the image shake.

The support member 1 includes a first support member 1A and a second support member 1B.

An X-axis rotation drive magnet Mv1, an X-axis rotation drive magnet Mv2, a Y-axis drive magnet Mv3, an X-axis position detection magnet Mh1, a Y-axis rotation position detection magnet Mh2, and a Y-axis rotation position detection magnet Mh3 are fixed to the first support member 1A.

Hereinafter, the X-axis position detection magnet Mh1, the Y-axis rotation position detection magnet Mh2, and the Y-axis rotation position detection magnet Mh3 are collectively referred to as position detection magnets.

The X-axis rotation drive magnet mv1, the X-axis rotation drive magnet mv2, and the Y-axis drive magnet mv3 are fixed to the second support member 1B.

FIG. 3 is a perspective view showing an appearance configuration of the image shake correction device 3 shown in FIGS. 1 and 2. FIG. 3 shows an appearance of the image shake correction device 3 in the reference state.

As shown in FIG. 3, the image shake correction device 3 comprises the support member 1 constituted by the first support member 1A and the second support member 1B and the movable member 2 to which the circuit board 21 on which the imager 20 is mounted is fixed.

The movable member 2 is sandwiched between the first support member 1A and the second support member 1B, and is biased against the first support member 1A by springs 24a, 24b, and 24c which are elastic members.

The springs 24a, 24b, and 24c may be any springs that can urge the movable member 2 to the first support member 1A by an elastic force, and may be replaced with rubber which is an elastic member, for example.

This image shake correction device 3 is fixed to a main body of the digital camera 100 in a state in which the light receiving surface 20a faces the imaging optical system 101 shown in FIG. 1.

The image shake correction device 3 corrects the image shake by moving the movable member 2 in the direction θ using, as a center, a rotation axis R (an axis which is parallel to the gravity direction and passes through the center P in the reference state) which is perpendicular to the light receiving surface 20a and passes through the center P of the light receiving surface 20a, the direction X which is the longitudinal direction of the light receiving surface 20a, and the direction Y which is the short direction of the light receiving surface 20a.

Hereinafter, a direction in which the rotation axis R extends is referred to as a direction Z. A flat surface perpendicular to the rotation axis R is a flat surface on which the movable member 2 moves.

The movable member 2 is movable in one direction (left direction) of the direction X and the other direction (right direction) of the direction X from the reference state by the same distance.

The movable member 2 is movable in one direction (up direction) of the direction Y and the other direction (down direction) of the direction Y from the reference state by the same distance.

The movable member 2 is rotatable in one direction (right rotation direction) of the direction θ and the other direction (left rotation direction) of the direction θ from the reference state by the same angle.

In the digital camera 100 shown in FIG. 1, a posture in which the direction Y shown in FIG. 3 is parallel to the gravity direction is a normal posture (a posture for performing so-called horizontal imaging).

Figure 4:
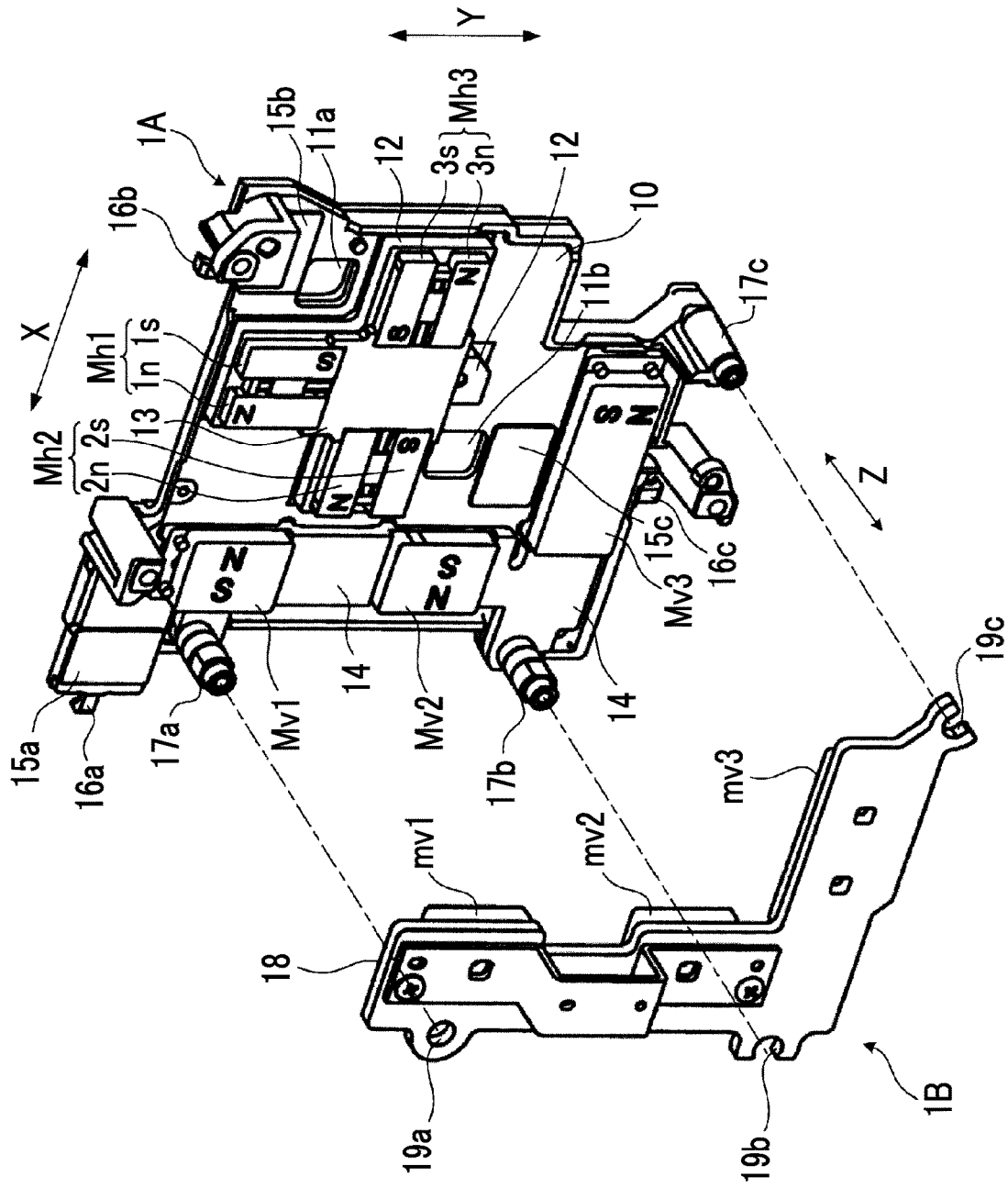
FIG. 4 is an exploded perspective view of a support member 1 in a case where the support member 1 in the image shake correction device 3 shown in FIG. 3 is viewed from an imaging optical system 101 side.

FIG. 4 is an exploded perspective view of the support member 1 in the image shake correction device 3 shown in FIG. 3 as viewed from the imaging optical system 101 side.

Figure 5:
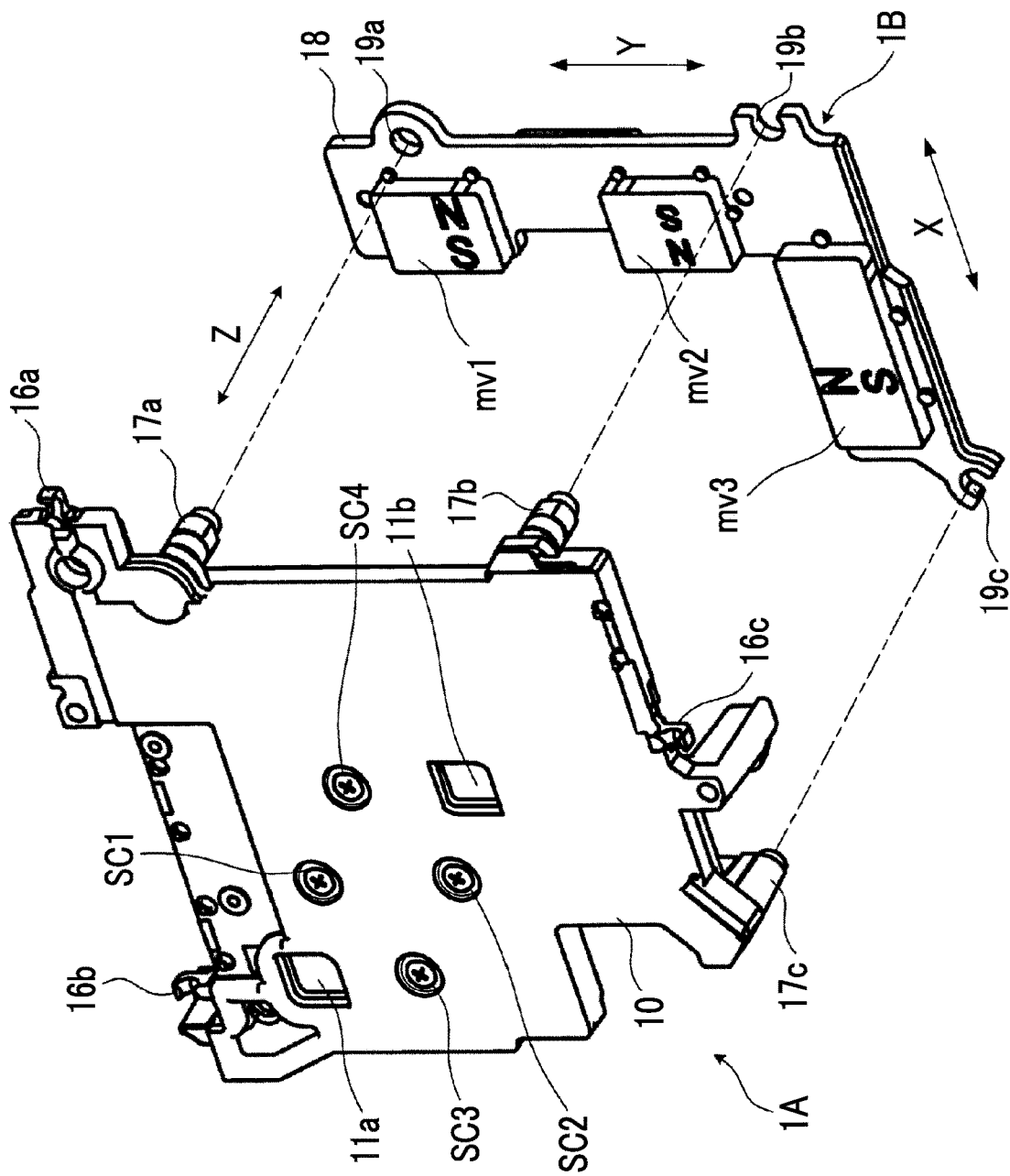
FIG. 5 is an exploded perspective view of the support member 1 shown in FIG. 4 as viewed from a side opposite to the imaging optical system 101 side.

FIG. 5 is an exploded perspective view of the support member 1 shown in FIG. 4 as viewed from a side opposite to the imaging optical system 101 side.

As shown in FIGS. 4 and 5, the first support member 1A comprises a plate-like base 10 that is made of resin and has a flat surface perpendicular to the direction Z, and projecting portions 17a, 17b, and 17c extending in the direction Z from a peripheral portion of the base 10 to the imaging optical system 101 side.

The second support member 1B has a substantially L-shaped yoke 18 as viewed from the imaging optical system 101 side. A hole portion 19a and notch portions 19b and 19c at positions facing the projecting portions 17a, 17b and 17c are formed at the yoke 18.

In a state in which the movable member 2 is disposed between the first support member 1A and the second support member 1B, the projecting portion 17a of the first support member 1A is fixed by being to the hole portion 19a of the second support member 1B.

In the same state, the projecting portion 17b of the first support member 1A is fixed by being to the notch portion 19b of the second support member 1B, and the projecting portion 17c of the first support member 1A is fixed by being to the notch portion 19c of the second support member 1B. Accordingly, the movable member 2 is supported by the support member 1.

As shown in FIG. 4, substantially L-shaped yokes 14 as viewed from the imaging optical system 101 side are formed at a left end portion in the direction X and a lower end portion in the direction Y as viewed from the imaging optical system 101 side on a surface of the base 10 on the imaging optical system 101 side.

The X-axis rotation drive magnet Mv1 and the X-axis rotation drive magnet Mv2 are arranged and fixed on a surface of portions of the yokes 14 of the first support member 1A that extends along the direction Y with a space in the direction Y.

As viewed from the imaging optical system 101 side, the X-axis rotation drive magnet Mv1 is disposed such that an N-pole faces the right direction of the direction X and an S-pole faces the left direction of the direction X.

As viewed from the imaging optical system 101 side, the X-axis rotation drive magnet Mv2 is disposed such that an N-pole faces the left direction of the direction X and an S-pole faces the right direction of the direction X.

The Y-axis drive magnet Mv3 is fixed on a front surface of a portion of the yoke 14 of the first support member 1A that extends along the direction X.

As viewed from the imaging optical system 101 side, the Y-axis drive magnet Mv3 is disposed such that an N-pole faces the down direction of the direction Y and an S-pole faces the up direction of the direction Y.

Figure 7:
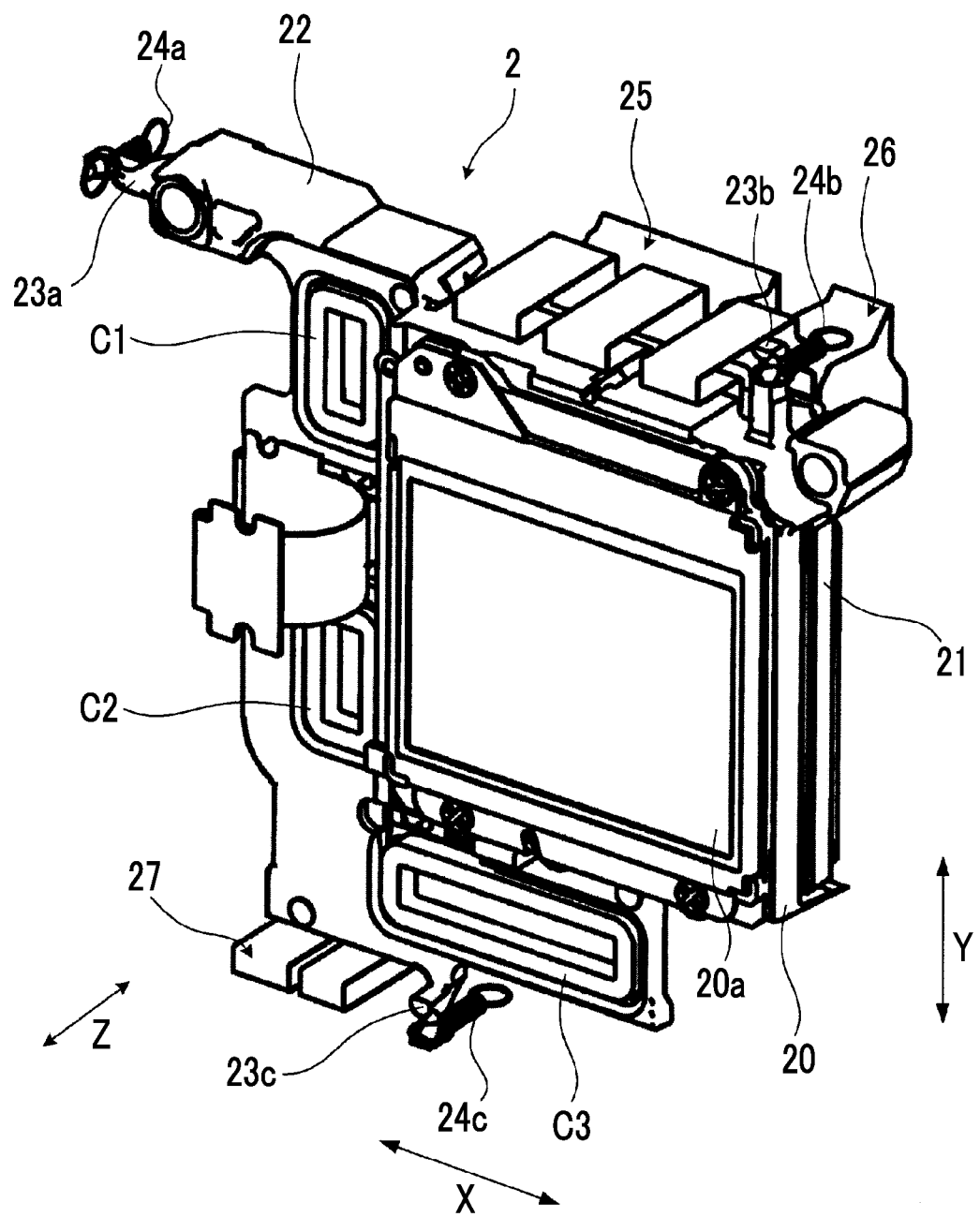
FIG. 7 is a perspective view of a movable member 2 in the image shake correction device 3 shown in FIG. 3 as viewed from the imaging optical system 101 side.

As shown in FIG. 5, the X-axis rotation drive magnet mv1 is fixed on a front surface of the yoke 18 of the second support member 1B on the first support member 1A side at a position facing the X-axis rotation drive magnet Mv1 of the first support member 1A with the X-axis rotation drive coil C1 of the movable member 2 described in FIG. 7 interposed therebetween.

An S-pole of the X-axis rotation drive magnet mv1 faces the N-pole of the X-axis rotation drive magnet Mv1 with the X-axis rotation drive coil C1 interposed therebetween. An N-pole of the X-axis rotation drive magnet mv1 faces the S-pole of the X-axis rotation drive magnet Mv1 with the X-axis rotation drive coil C1 interposed therebetween.

As shown in FIG. 5, the X-axis rotation drive magnet mv2 is fixed on a front surface of the yoke 18 of the second support member 1B on the first support member 1A side at a position facing the X-axis rotation drive magnet Mv2 of the first support member 1A with the X-axis rotation drive coil C2 of the movable member 2 described in FIG. 7 interposed therebetween.

An S-pole of the X-axis rotation drive magnet mv2 faces the N-pole of the X-axis rotation drive magnet Mv2 with the X-axis rotation drive coil C2 interposed therebetween. An N-pole of the X-axis rotation drive magnet mv2 faces the S-pole of the X-axis rotation drive magnet Mv2 with the X-axis rotation drive coil C2 interposed therebetween.

As shown in FIG. 5, the Y-axis drive magnet mv3 is fixed on a front surface of the yoke 18 of the second support member 1B on the first support member 1A side at a position facing the Y-axis drive magnet Mv3 with the Y-axis drive coil C3 of the movable member 2 described in FIG. 7 interposed therebetween.

An S-pole of the Y-axis drive magnet mv3 faces the N-pole of the Y-axis drive magnet Mv3 with the Y-axis drive coil C3 interposed therebetween. An N-pole of the Y-axis drive magnet mv3 faces the S-pole of the Y-axis drive magnet Mv3 with the Y-axis drive coil C3 interposed therebetween.

As shown in FIG. 4, substantially plus-shaped yokes 12 as viewed in the direction Z are fixed at a portion facing the circuit board 21 fixed to the movable member 2 described in FIG. 7 on a front surface of the imaging optical system 101 side of the base 10 of the first support member 1A.

The X-axis position detection magnet Mh1 is fixed on a front surface of the yoke 12 at a position facing the X-axis position detection Hall element H1 (see FIG. 8 to be described below) fixed to the circuit board 21 fixed to the movable member 2.

The X-axis position detection magnet Mh1 and the yoke 12 overlapping this X-axis position detection magnet Mh1 constitute a magnetic force generator.

The X-axis position detection magnet Mh1 has an S-pole is and an N-pole in that are arranged with a space in the direction X. The X-axis position detection Hall element H1 is disposed so as to face an intermediate position between the S-pole is and the N-pole 1n.

The N-pole in of the X-axis position detection magnet Mh1 is disposed on the left side in the direction X as viewed from the imaging optical system 101 side with respect to the S-pole is of the X-axis position detection magnet Mh1.

The Y-axis rotation position detection magnet Mh2 is fixed on the front surface of the yoke 12 at a position facing the Y-axis rotation position detection Hall element H2 (see FIG. 8 to be described below) fixed to the circuit board 21 fixed to the movable member 2.

The Y-axis rotation position detection magnet Mh2 and the yoke 12 overlapping this Y-axis rotation position detection magnet Mh2 constitute a magnetic force generator.

The Y-axis rotation position detection magnet Mh2 has an S-pole 2s and an N-pole 2n arranged with a space in the direction Y. The Y-axis rotation position detection Hall element H2 is disposed so as to face an intermediate position between the S-pole 2s and the N-pole 2n.

The N-pole 2n of the Y-axis rotation position detection magnet Mh2 is disposed on the upper side of the direction Y as viewed from the imaging optical system 101 side with respect to the S-pole 2s of the Y-axis rotation position detection magnet Mh2.

The Y-axis rotation position detection magnet Mh3 is fixed on the front surface of the yoke 12 at a position facing the Y-axis rotation position detection Hall element H3 (see FIG. 8 to be described below) fixed to the circuit board 21 fixed to the movable member 2.

The Y-axis rotation position detection magnet Mh3 and the yoke 12 overlapping this Y-axis rotation position detection magnet Mh3 constitute a magnetic force generator.

The Y-axis rotation position detection magnet Mh3 has an S-pole 3s and an N-pole 3n arranged with a space in the direction Y. The Y-axis rotation position detection Hall element H3 is disposed so as to face an intermediate position between the S-pole 3s and the N-pole 3n.

The N-pole 3n of the Y-axis rotation position detection magnet Mh3 is disposed on the lower side of the direction Y as viewed from the imaging optical system 101 side with respect to the S-pole 3s of the Y-axis rotation position detection magnet Mh3.

In the example shown in FIG. 4, the X-axis position detection magnet Mh1, the Y-axis rotation position detection magnet Mh2, and the Y-axis rotation position detection magnet Mh3 are coupled and integrated by a coupling member 13. The coupling member 13 is fixed to the yoke 12 with a screw or an adhesive.

The X-axis position detection magnet Mh1, the Y-axis rotation position detection magnet Mh2, and the Y-axis rotation position detection magnet Mh3 have a structure in which an interval between the S-pole and the N-pole and sizes of the S-pole and the N-pole are the same.

Figure 6:
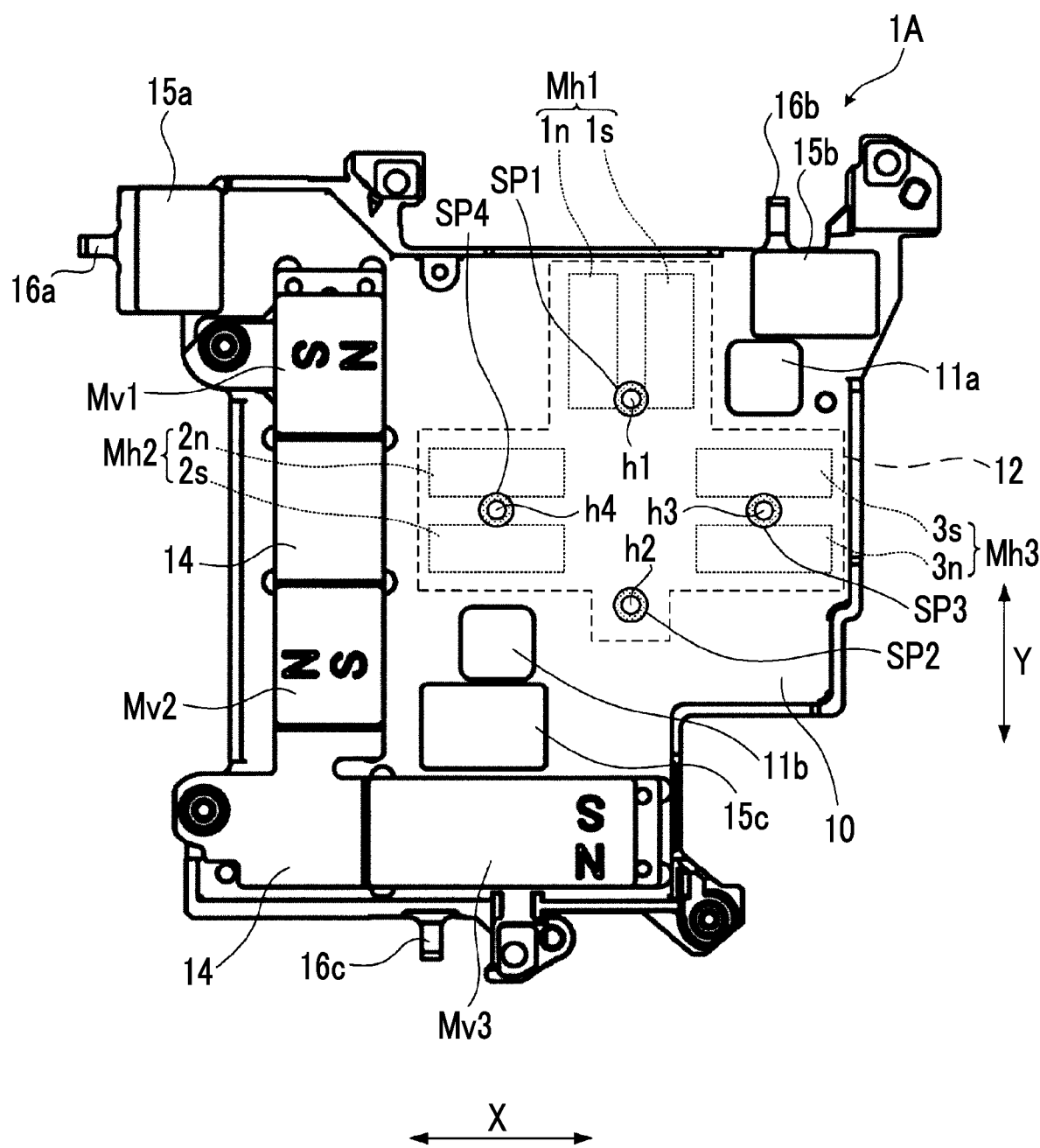
FIG. 6 is a front view of a first support member 1A shown in FIGS. 4 and 5 as viewed in a direction Z from the imaging optical system 101 side.

FIG. 6 is a front view of the first support member 1A shown in FIGS. 4 and 5 as viewed in the direction Z from the imaging optical system 101 side.

FIG. 6 shows a state in which the yoke 12 shown in FIG. 4 is removed from the first support member 1A. In FIG. 6, the yoke 12 and the position detection magnet are indicated by broken lines.

As shown in FIG. 6, through-holes h1 to h4 penetrating in the direction Z in a region where the yoke 12 is disposed are formed in the base 10.

The through-hole h1 and the through-hole h2 are arranged in the direction Y. A straight line connecting a center of the through-hole h1 and a center of the through-hole h2 overlaps the center P of the light receiving surface 20a of the imager 20.

The through-hole h3 and the through-hole h4 are arranged in the direction X. A straight line connecting a center of the through-hole h3 and a center of the through-hole h4 overlaps the center P of the light receiving surface 20a of the imager 20.

Screw holes are formed on a surface of the yoke 12 facing the base 10 at positions facing the through-holes h1 to h4.

As shown in FIG. 6, ring-shaped spacers SP1 to SP4 (portions hatched in this diagram) are arranged between these four screw holes formed in the yoke 12 and the through-holes h1 to h4 facing these screw holes.

As shown in FIG. 5, a screw SC1 is inserted into the through-hole h1 and the spacer SP1 from a side opposite to the imaging optical system 101 side of the base 10, and the screw SC1 is screwed into the screw hole of the yoke 12 facing the through-hole h1.

A screw SC2 is inserted into the through-hole h2 and the spacer SP2 from a side opposite to the imaging optical system 101 side of the base 10, and the screw SC2 is screwed into the screw hole of the yoke 12 facing the through-hole h2.

A screw SC3 is inserted into the through-hole h3 and the spacer SP3 from a side opposite to the imaging optical system 101 side of the base 10, and the screw SC3 is screwed into the screw hole of the yoke 12 facing the through-hole h3.

A screw SC4 is inserted into the through-hole h4 and the spacer SP4 from the side opposite to the imaging optical system 101 side of the base 10, and this screw SC4 is screwed into the screw hole of the yoke 12 facing the through-hole h4.

In this manner, the yoke 12 is fixed to the base 10 by the spacers SP1 to SP4 in a state in which the four screws SC1 to SC4 are interposed between the spacers and the base 10.

The spacers SP1 to SP4 function as adjustment members for adjusting a distance between the magnetic force generator constituted by the position detection magnet and the yoke 12 and the first support member 1A.

As shown in FIG. 4, three flat surfaces 15a, 15b, and 15c perpendicular to the direction Z are formed on the surface of the imaging optical system 101 side of the base 10. The positions of the flat surfaces 15a, 15b, and 15c in the direction Z are all the same, and these flat surfaces are all formed on the same flat surface (a flat surface parallel to a flat surface on which the movable member 2 moves).

The surface of the base 10 on which the yoke 12 is disposed is parallel to the flat surfaces 15a, 15b, and 15c.

On the surface on the imaging optical system 101 side of the base 10, a through-hole 11a for restricting the movement of the movable member 2 is formed on an upper side in the direction Y from the Y-axis rotation position detection magnet Mh3, and a through-hole 11b for restricting the movement of the movable member 2 is formed on a lower side in the direction Y from the Y-axis rotation position detection magnet Mh2, as viewed from the imaging optical system 101 side.

A hook 16a extending in the left direction of the direction X in which one end of the spring 24a shown in FIG. 3 is locked, a hook 16b extending in the up direction of the direction Y in which one end of the spring 24b shown in FIG. 3 is locked, and a hook 16c extending in the down direction of the direction Y in which one end of the spring 24c shown in FIG. 3 is locked are formed at a peripheral portion of the base 10.

FIG. 7 is a perspective view of the movable member 2 in the image shake correction device 3 shown in FIG. 3 as viewed from the imaging optical system 101 side.

Figure 8:
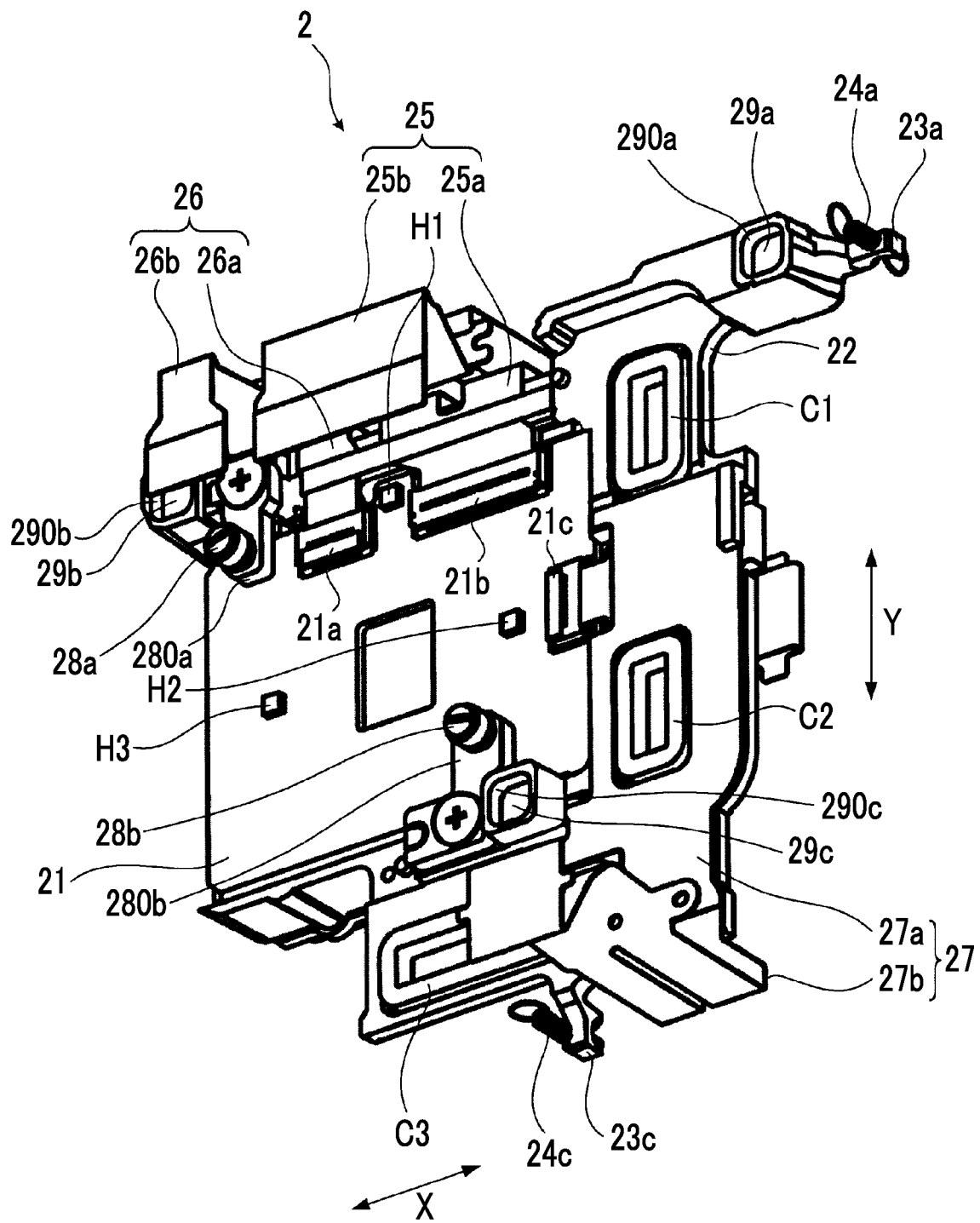
FIG. 8 is a perspective view of the movable member 2 shown in FIG. 7 as viewed from a side opposite to the imaging optical system 101 side.

FIG. 8 is a perspective view of the movable member 2 shown in FIG. 7 as viewed from the side opposite to the imaging optical system 101 side.

Figure 9:
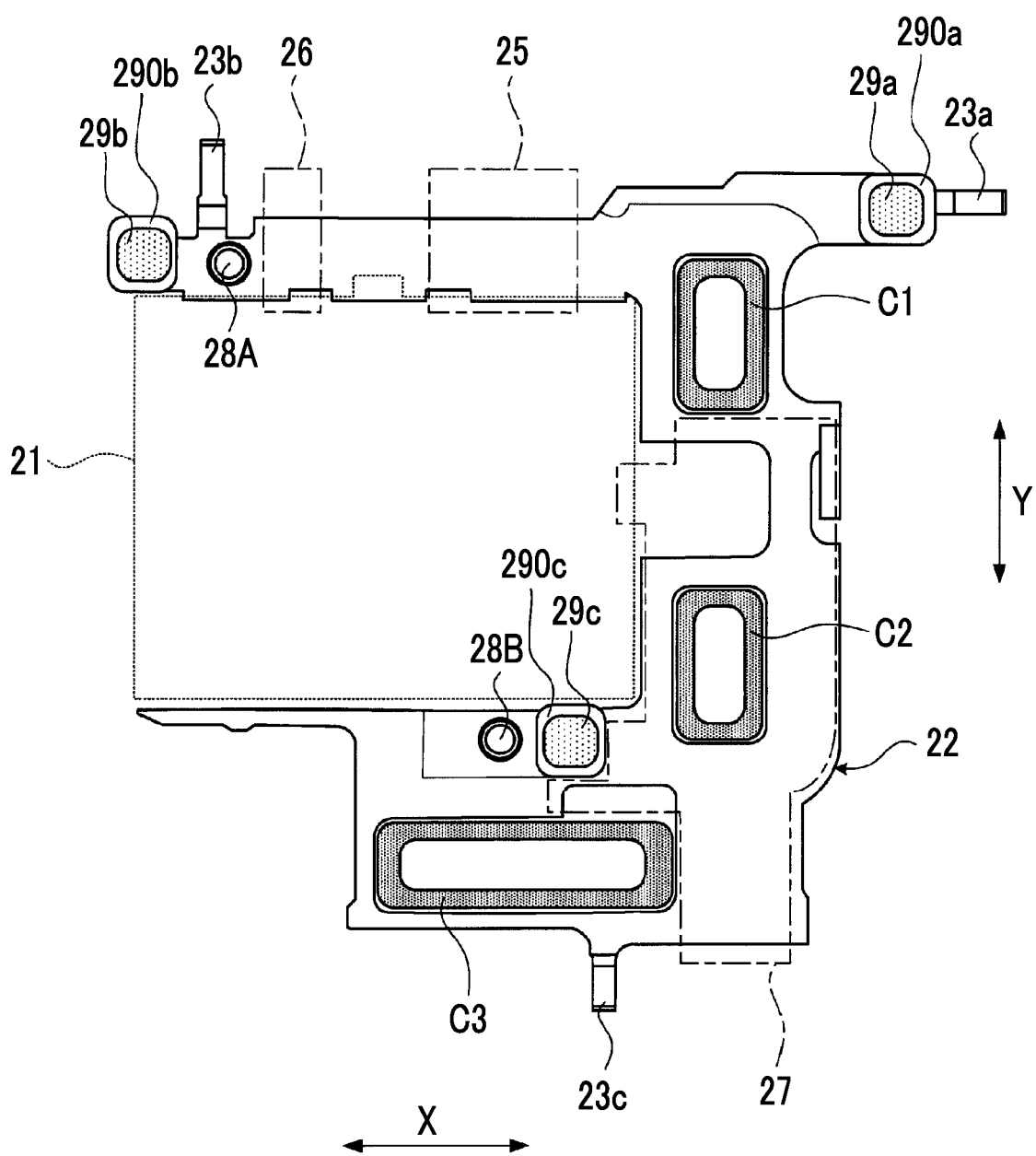
FIG. 9 is a plan view of the movable member 2 shown in FIG. 7 as viewed from the side opposite to the imaging optical system 101 side.

FIG. 9 is a plan view of the movable member 2 shown in FIG. 7 as viewed from the side opposite to the imaging optical system 101 side. In FIG. 9, in order to facilitate understanding of the configuration of the movable member 2, the circuit board 21 fixed to the movable member 2 is indicated by a broken line, and flexible print substrates 25, 26, and 27 connected to the circuit board 21 are indicated by imaginary lines.

As shown in FIG. 9, the movable member 2 comprises a substantially C-shaped base 22 constituted a straight-line-shaped portion extending in the direction X, a straight-line-shaped portion extending in the direction Y from a right end portion of this portion in the direction X, and a straight-line-shaped portion extending to the left side in the direction X from a lower end portion of a portion extending in the direction Y as viewed from the imaging optical system 101 side.

As shown in FIGS. 7 and 8, the circuit board 21 on which the imager 20 is mounted is fixed to the base 22 with an adhesive at a portion facing a region surrounded by the three portions.

As shown in FIGS. 7 to 9, the X-axis rotation drive coil C1 is formed at the base 22 at a position facing each of the X-axis rotation drive magnets Mv1 and mv1 shown in FIG. 4.

The X-axis rotation drive coil C2 is formed at the base 22 at a position facing each of the X-axis rotation drive magnets Mv2 and mv2 shown in FIG. 4.

The Y-axis drive coil C3 is formed at the base 22 at a position facing each of the Y-axis drive magnets Mv3 and mv3 shown in FIG. 4.

The X-axis rotation drive coil C1 shown in FIGS. 7 to 9 and the X-axis rotation drive magnets Mv1 and mv1 shown in FIG. 4 constitute an X-axis drive voice coil motor (VCM).

The X-axis drive VCM moves the movable member 2 in the direction X by electromagnetic induction between the X-axis rotation drive coil C1 and the X-axis rotation drive magnets Mv1 and mv1 by causing a control current to flow through the X-axis rotation drive coil C1.

The X-axis rotation drive coil C2 shown in FIGS. 7 to 9 and the X-axis rotation drive magnets Mv2 and mv2 shown in FIG. 4 constitute a VCM. This VCM and the X-axis drive VCM constitute a rotation drive VCM.

The rotation drive VCM rotates the movable member 2 around the rotation axis R with the center P of the light receiving surface 20a with a rotation center by an electromagnetic induction action between the X-axis rotation drive coil C1 and the X-axis rotation drive magnets Mv1 and mv1 and an electromagnetic induction between the X-axis rotation drive coil C2 and the X-axis rotation drive magnets Mv2 and mv2 by reversing the directions of the control currents flowing through the X-axis rotation drive coil C1 and the X-axis rotation drive coil C2 shown in FIGS. 7 to 9.

The Y-axis drive coil C3 shown in FIGS. 7 to 9 and the Y-axis drive magnets Mv3 and mv3 shown in FIG. 4 constitute a Y-axis drive VCM.

The Y-axis drive VCM moves the movable member 2 in the direction Y by an electromagnetic induction between the Y-axis drive coil C3 and the Y-axis drive magnets Mv3 and mv3 by causing the control current to flow through the Y-axis drive coil C3.

As shown in FIG. 8, the X-axis position detection Hall element H1 is fixed at a position facing the intermediate position between the S-pole is and the N-pole 1n of the X-axis position detection magnet Mh1 on a surface of the first support member 1A side of the circuit board 21 fixed to the base 22 (hereinafter, referred to as a rear surface of the circuit board 21).

The Y-axis rotation position detection Hall element H2 is fixed at a position facing the intermediate position between the S-pole 2s and the N-pole 2n of the Y-axis rotation position detection magnet Mh2 on the rear surface of the circuit board 21.

The Y-axis rotation position detection Hall element H3 is fixed at a position facing the intermediate position between the S-pole 3s and the N-pole 3n of the Y-axis rotation position detection magnet Mh3 on the rear surface of the circuit board 21.

The X-axis position detection Hall element H1 outputs a signal corresponding to a magnetic field supplied from the X-axis position detection magnet Mh1. The system controller 108 detects the position of the movable member 2 in the direction X by an output change of this signal.

The Y-axis rotation position detection Hall element H2 outputs a signal corresponding to a magnetic field supplied from the Y-axis rotation position detection magnet Mh2. The system controller 108 detects the position of the movable member 2 in the direction Y based on an output change of this signal.

The Y-axis rotation position detection Hall element H3 outputs a signal corresponding to a magnetic field supplied from the Y-axis rotation position detection magnet Mh3.

The system controller 108 detects, as a position of the movable member 2 in the direction θ, a rotation angle of the movable member 2 around the rotation axis R due to the change of the output signal of the Y-axis rotation position detection Hall element H3 and the change of the output signal of the Y-axis rotation position detection Hall element H2.

Figure 10:
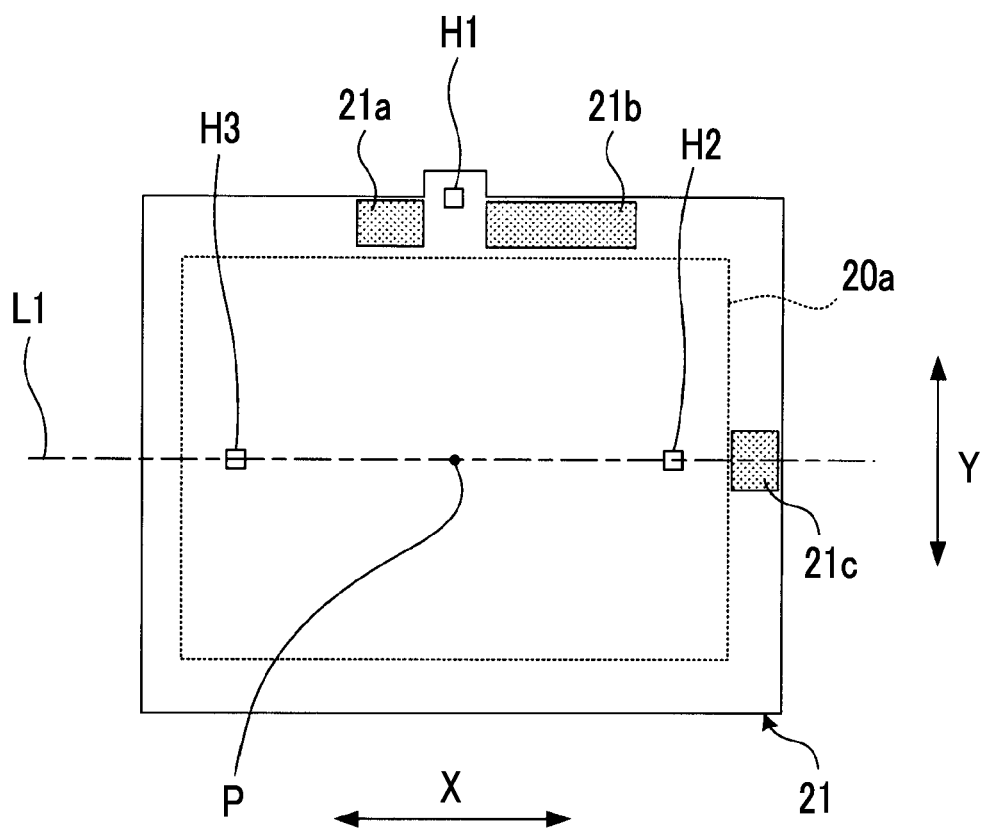
FIG. 10 is a diagram showing a state in which a rear surface of a circuit board 21 fixed to a base 22 of the movable member 2 shown in FIG. 8 is viewed in the direction Z.

FIG. 10 is a diagram showing a state in which the rear surface of the circuit board 21 fixed to the base 22 of the movable member 2 shown in FIG. 8 is viewed in the direction Z.

In FIG. 10, the center P of the light receiving surface 20a of the imager 20 that overlaps the rear surface of the circuit board 21 is shown. In FIG. 10, a straight line L1 which passes through the center P and is parallel to the direction X, and the Y-axis rotation position detection Hall element H2 and the Y-axis rotation position detection Hall element H3 are arranged on the straight line L1.

A distance from the Y-axis rotation position detection Hall element H2 to the center P and a distance from the Y-axis rotation position detection Hall element H3 to the center P are the same.

As shown in FIG. 4, the Y-axis rotation position detection magnet Mh2 facing the Y-axis rotation position detection Hall element H2 and the Y-axis rotation position detection magnet Mh3 facing the Y-axis rotation position detection Hall element H3 are arranged such that magnetic poles are opposite to each other in the direction Y.

In a case where the movable member 2 rotates in the right direction of the direction θ as viewed from the imaging optical system 101 side, the Y-axis rotation position detection Hall element H2 and the Y-axis rotation position detection Hall element H3 move in opposite directions to each other in the direction Y by the same distance. Thus, the outputs of the Y-axis rotation position detection Hall element H2 and the Y-axis rotation position detection Hall element H3 are changed in the same manner.

The output signal of the Y-axis rotation position detection Hall element H2 output signal, the movement direction and the movement distance of the Y-axis rotation position detection Hall element H2, the output signal of the Y-axis rotation position detection Hall element H3, the movement direction and the movement distance of the Y-axis rotation position detection Hall element H3, and the rotation angle of the movable member 2 in the direction θ are associated with each other in advance, and thus, it is possible to detect the rotation position of the movable member 2 in the direction θ by the output signals of the Y-axis rotation position detection Hall element H2 and the Y-axis rotation position detection Hall element H3.

One of the Y-axis rotation position detection Hall element H2 and the Y-axis rotation position detection Hall element H3 constitutes a first position detector, and the other one constitutes a second position detector.

Meanwhile, in a case where the movable member 2 moves only in the direction Y, the Y-axis rotation position detection Hall element H2 and the Y-axis rotation position detection Hall element H3 move in the same direction in the direction Y by the same distance.

Thus, the output signals of the Y-axis rotation position detection Hall element H2 and the Y-axis rotation position detection Hall element H3 are changed in opposite directions.

Therefore, in a case where the outputs of the Y-axis rotation position detection Hall element H2 and the Y-axis rotation position detection Hall element H3 are changed in opposite directions, it is possible to detect the position of the movable member 2 in the direction Y by viewing the output of the Y-axis rotation position detection Hall element H2 or the Y-axis rotation position detection Hall element H3.

As shown in FIGS. 7 to 9, a hook 23a extending in the same direction (direction X) as the hook 16a is formed at the base 22 at a position facing the hook 16a (see FIG. 4) of the support member 1. The other end of the spring 24a shown in FIG. 3 is locked to the hook 23a.

The movable member 2 is biased toward the first support member 1A by the spring 24a locked to the hooks 16a and 23a.

As shown in FIGS. 7 and 9, a hook 23b extending in the same direction (up direction of the direction Y) as the hook 16b is formed at the base 22 at a position facing the hook 16b (see FIG. 4) of the support member 1. The other end of the spring 24b shown in FIG. 3 is locked to the hook 23b.

The movable member 2 is biased toward the first support member 1A by the spring 24b locked to the hooks 16b and 23b.

As shown in FIGS. 7 to 9, a hook 23c extending in the same direction (down direction of the direction Y) as the hook 16c is formed at the base 22 at a position facing the hook 16c (see FIG. 4) of the support member 1. The other end of the spring 24c shown in FIG. 3 is locked to the hook 23c.

The movable member 2 is biased toward the first support member 1A by the spring 24c locked to the hooks 16c and 23c.

The pair of the hook 16a and the hook 23a, the pair of the hook 16b and the hook 23b, and the pair of the hook 16c and the hook 23c are formed such that a center of gravity of the movable member 2 is disposed inside a triangle formed by connecting these three pairs in plan view viewed in the direction Z.

As shown in FIGS. 8 and 9, a recess portion 290a that accommodates a rolling element (spherical ball) for causing the movable member 2 to be movable on a surface perpendicular to the direction Z at a position facing the flat surface 15a of the first support member 1A shown in FIG. 4 is formed at the base 22. A bottom surface 29a of the recess portion 290a is a flat surface perpendicular to the direction Z.

A recess portion 290b that accommodates a rolling element for causing the movable member 2 to be movable on the surface perpendicular to the direction Z at a position facing the flat surface 15b of the first support member 1A shown in FIG. 4 is formed at the base 22. A bottom surface 29b of the recess portion 290b is a flat surface perpendicular to the direction Z.

A recess portion 290c that accommodates a rolling element for causing the movable member 2 to be movable on the surface perpendicular to the direction Z is formed at the base 22 at a position facing the flat surface 15c of the first support member 1A shown in FIG. 4. A bottom surface 29c of the recess portion 290c is a flat surface perpendicular to the direction Z.

The positions of the bottom surfaces 29a, 29b, and 29c in the direction Z are all the same, and the bottom surfaces are all formed on the same flat surface (a flat surface parallel to a flat surface on which the movable member 2 moves).

The movable member 2 moves on the flat surface perpendicular to the direction Z by rolling the rolling elements disposed between the bottom surface 29a of the movable member 2 and the flat surface 15a of the first support member 1A, between the bottom surface 29b of the movable member 2 and the flat surface 15b of the first support member 1A, and between the bottom surface 29c of the movable member 2 and the flat surface 15c of the first support member 1A.

As shown in FIG. 9, an attachment portion 28A is formed on the surface of the first support member 1A side of the base 22.

As shown in FIG. 8, a flat plate portion 280a extending in the down direction of the direction Y at a position overlapping the circuit board 21 is fixed to the attachment portion 28A with screws. An insertion member 28a protruding in the direction Z toward the first support member 1A side is formed at the flat plate portion 280a.

As shown in FIG. 9, an attachment portion 28B is formed on the surface of the first support member 1A side of the base 22.

As shown in FIG. 8, a flat plate portion 280b extending in the up direction of the direction Y at a position overlapping the circuit board 21 is fixed to the attachment portion 28B with screws. An insertion member 28b protruding in the direction Z toward the first support member 1A side is formed at the flat plate portion 280b.

The insertion member 28a is inserted into the through-hole 11a of the first support member 1A shown in FIG. 4. The insertion member 28b is inserted into the through-hole 11b of the first support member 1A shown in FIG. 4.

In a case where the movable member 2 moves on the surface perpendicular to the direction Z, the movement range of the insertion member 28a is limited to the inside of the through-hole 11a, and the movement range of the insertion member 28b is limited to the inside of the through-hole 11b.

Thus, the movement range of the movable member 2 (the movement range in the direction X, the movement range in the direction Y, and the movement range in the direction θ) is restricted to a predetermined range by the pair of the insertion member 28a and the through-hole 11a and the pair of the insertion member 28b and the through-hole 11b.

As shown in FIG. 8, a connector 21a and a connector 21b are formed at an upper end portion of the rear surface of the circuit board 21 fixed to the movable member 2 in the direction Y. A connector 21c is formed at an end portion on a side close to the base 22 among the end portions on the rear surface of the circuit board 21 in the direction X.

The connector 21a and the connector 21b include terminals connected to various terminals (a power supply terminal which is a terminal for supplying a power, a ground terminal which is a terminal for grounding, a terminal for outputting a signal, and a drive terminal) of the imager 20 mounted on the circuit board 21.

The flexible print substrate 26 including wirings connected to the terminals included in the connectors is connected to the connector 21a.

The flexible print substrate 25 including wirings connected to the terminals included in the connectors is connected to the connector 21b.

The connector 21c includes terminals connected to output terminals of the X-axis position detection Hall element H1, the Y-axis rotation position detection Hall element H2, and the Y-axis rotation position detection Hall element H3 mounted on the rear surface of the circuit board 21.

The flexible print substrate 27 including wirings connected to the terminals included in the connector is connected to the connector 21c.

The flexible print substrate 27 includes a fixed portion 27a that extends along the direction Y and is fixed to the base 22, and a non-fixed portion 27b that is free with respect to the base 22.

Figure 11:
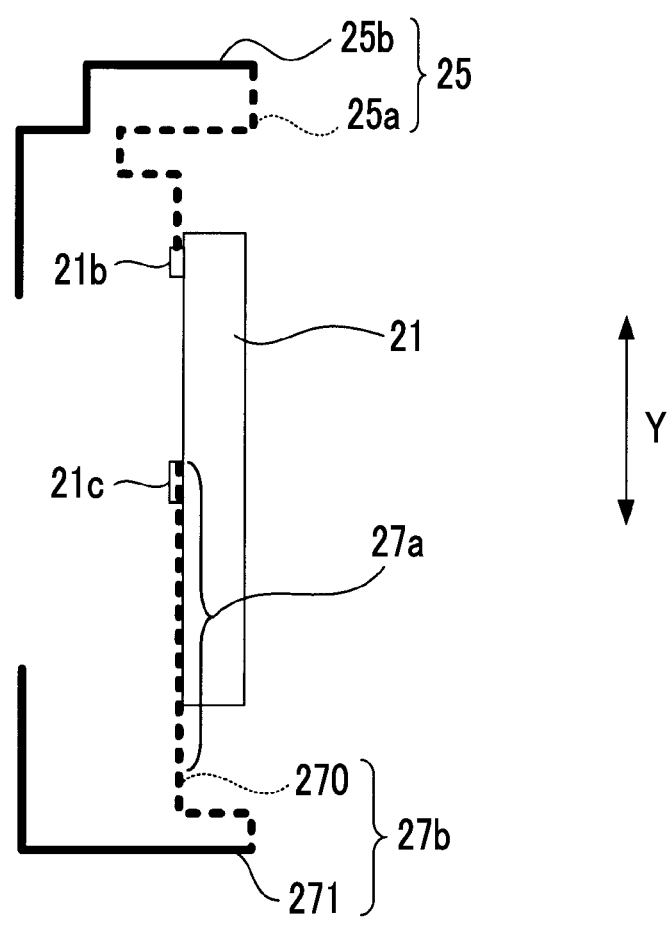
FIG. 11 is a side view showing a state in which the circuit board 21 fixed to the movable member 2 shown in FIG. 7 and a flexible print substrate connected to the circuit board are viewed in a direction X.

FIG. 11 is a side view showing of the circuit board 21 fixed to the movable member 2 shown in FIG. 7 and the flexible print substrate connected to the circuit board as viewed in the direction X. In FIG. 11, a part of the flexible print substrates is shown by a broken line in order to facilitate understanding.

As shown in FIGS. 11 and 8, the flexible print substrate 25 includes a first portion 25a (broken line portion) extending in the up direction of the direction Y from the connector 21b and a folded portion 25b (solid line portion) folded in the down direction of the direction Y at an end portion of the first portion 25a.

Although not shown in FIG. 11, the flexible print substrate 26 has the same configuration as that of the flexible print substrate 25, and includes a first portion 26a extending in the up direction of the direction Y from the connector 21a and a folded portion 26b folded in the down direction of the direction Y at an end portion of the first portion 26a, as shown in FIG. 8.

As shown in FIG. 11, the flexible print substrate 27 includes a fixed portion 27a which is fixed to the base 22, and includes a second portion 270 (broken line portion) which extends in the down direction of the direction Y, and a folded portion 271 (solid line portion) folded in the up direction of the direction Y at an end portion of the second portion 270.

The non-fixed portion 27b shown in FIG. 8 is constituted by a portion excluding the fixed portion 27a of the second portion 270 and the folded portion 271.

A distal end of the folded portion 25b, a distal end of the folded portion 26b, and a distal end of the folded portion 271 are connected to a connector of a main substrate (a substrate on which the system controller 108 is formed) (not shown) in the digital camera 100.

Next, a manufacturing method of the image shake correction device 3 having the aforementioned configuration will be described.

Figure 12:
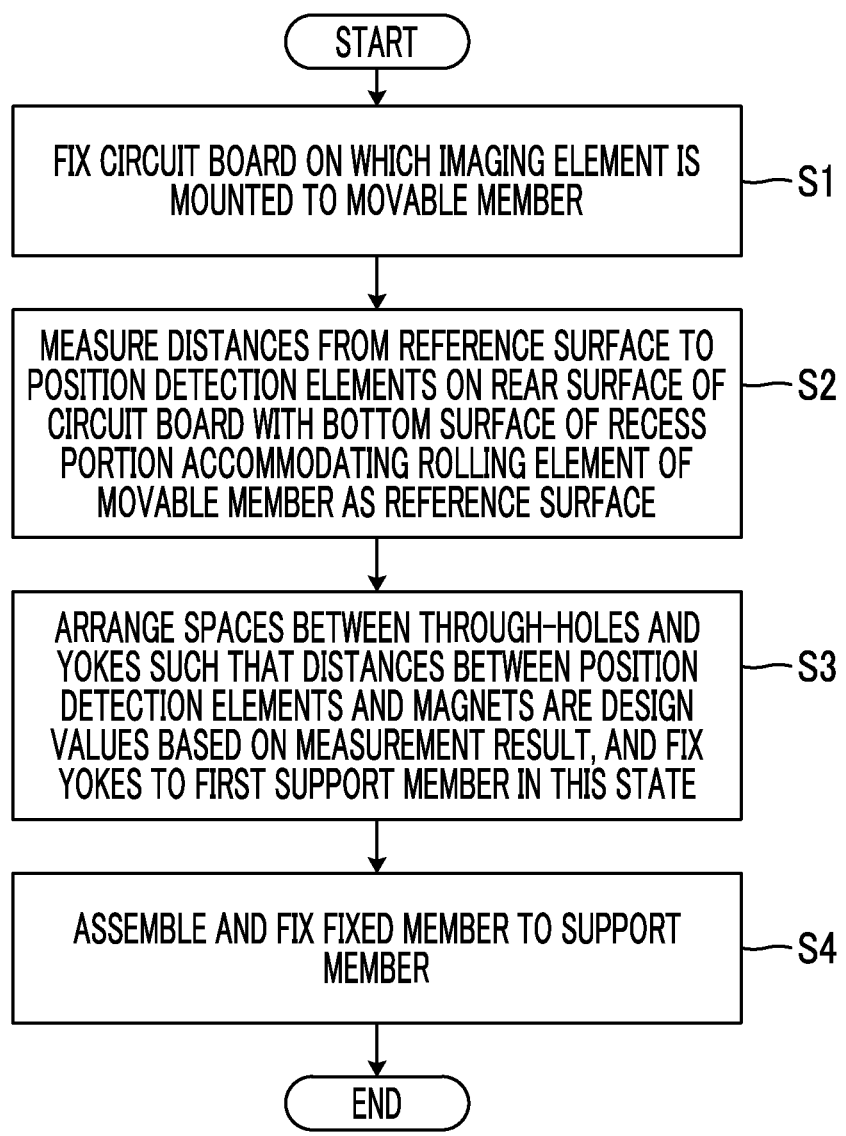
FIG. 12 is a flowchart for describing a method of manufacturing the image shake correction device 3.

FIG. 12 is a flowchart for describing a manufacturing method of the image shake correction device 3.

First, the support member 1 on which components other than the yoke 12 are formed and the movable member 2 on which components other than the circuit board 21 on which the imager 20 is mounted are prepared.

The circuit board 21 is fixed to the movable member 2 with an adhesive in a state in which any one of the bottom surfaces 29a to 29c of the movable member 2 and the light receiving surface 20a of the imager 20 are parallel (step S1). Step S1 constitutes a first step.

Subsequently, any one of the bottom surfaces 29a to 29c of the movable member 2 is used as a reference surface, and a first distance from the reference surface to the X-axis position detection Hall element H1 formed on the rear surface of the circuit board 21, a second distance from the reference surface to the Y-axis rotation position detection Hall element H2, and a third distance from the reference surface to the Y-axis rotation position detection Hall element H3 are measured (step S2).

Subsequently, in a case where the movable member 2 is assembled to the support member 1 to which the position detection magnet is fixed, thicknesses of the spacers SP1 to SP4 are decided based on the first distance, the second distance, and the third distance measured in step S2 such that a distance between the X-axis position detection magnet Mh1 and the X-axis position detection Hall element H1, a distance between the Y-axis rotation position detection magnet Mh2 and the Y-axis rotation position detection Hall element H2, and a distance between the Y-axis rotation position detection magnet Mh3 and the Y-axis rotation position detection Hall element H3 have predetermined design values.

The spacers SP1 to SP4 having the thicknesses decided in this manner are arranged on the through-holes h1 to h4 of the base 10 of the prepared first support member 1A, and the yoke 12 is disposed thereon.

In this state, the screws SC1 to SC4 are inserted into the through-holes h1 to h4 from the rear surface of the base 10. The screws SC1 to SC4 are screwed into the screw holes of the yoke 12 via the spacers SP1 to SP4, and the yoke 12 is fixed to the base 10 (step S3). Steps S2 and S3 constitute a second step.

Thereafter, the movable member 2 is assembled to the support member 1 by coupling and fixing the first support member 1A and the second support member 1B to each other in a state in which balls are interposed between the recess portions 290a to 290c of the movable member 2 and the flat surfaces 15a to 15c of the first support member 1A (step S4).

Finally, the image shake correction device 3 is completed by locking the spring 24a to the hook 16a and the hook 23a, locking the spring 24b to the hook 16b and the hook 23b, and locking the spring 24c to the hook 16c and the hook 23c.

As described above, the image shake correction device 3 decides the thicknesses of the spacers SP1 to SP4 arranged between the yoke 12 and the base 10 such that the distance between the X-axis position detection magnet Mh1 and the X-axis position detection Hall element H1, the distance between the Y-axis rotation position detection magnet Mh2 and the Y-axis rotation position detection Hall element H2, and the distance between the Y-axis rotation position detection magnet Mh3 and the Y-axis rotation position detection Hall element H3 are uniform.

Thus, in a case where the circuit board 21 is fixed to the movable member 2, even though the rear surface of the circuit board 21 is inclined with respect to the flat surface on which the movable member 2 moves, the distances between the position detectors fixed to the rear surface of the circuit board 21 and the position detection magnets fixed to the support member 1 can be uniform, and the position detection accuracy of the movable member 2 can be improved.

The image shake correction device 3 detects the position of the movable member 2 in the direction θ by the Y-axis rotation position detection Hall element H2 and the Y-axis rotation position detection Hall element H3.

In a case where the position of the movable member 2 is detected by using two position detectors, it is particularly important that the output characteristics of the two position detectors are uniform. Thus, the configuration having the spacers SP1 to SP4 is particularly effective.

In the image shake correction device 3, the yoke 12 shown in FIG. 4 may be separated for each of the X-axis position detection magnet Mh1, the Y-axis rotation position detection magnet Mh2, and the Y-axis rotation position detection magnet Mh3.

In a case where the yoke 12 is separated in this manner, a spacer is disposed between the yoke disposed below each of the X-axis position detection magnet Mh1, the Y-axis rotation position detection magnet Mh2, and the Y-axis rotation position detection magnet Mh3 and the base 10 of the first support member 1A.

The thickness of this spacer is adjusted, and thus, the distance between each of the X-axis position detection magnet Mh1, the Y-axis rotation position detection magnet Mh2, and the Y-axis rotation position detection magnet Mh3 and the position detector may be uniform.

As shown in FIG. 4, according to the configuration in which the X-axis position detection magnet Mh1, the Y-axis rotation position detection magnet Mh2, and the Y-axis rotation position detection magnet Mh3 are fixed on one yoke 12, the front surface of the position detector and the front surface of the position detection magnet can be parallel.

Thus, the output characteristics of the position detectors can be more uniform, and high-accuracy position detection can be performed compared with a case where the yoke is separated.

It has been described that it is assumed that any one of the flat surfaces 15a to 15c of the first support member 1A is used as the reference surface, and a fourth distance from the reference surface to the X-axis position detection magnet Mh1, a fifth distance from the reference surface to the Y-axis rotation position detection magnet Mh2, and a sixth distance from the reference surface to the Y-axis rotation position detection magnet Mh3 are the same.

However, the fourth distance to the sixth distance may vary depending on a tolerance of the position detection magnet itself or an error in attaching the position detection magnet to the yoke 12.

Accordingly, the fourth distance to the sixth distance are measured in a state in which the yoke 12 is disposed on the base 10 of the first support member 1A. In a case where the movable member 2 is assembled to the support member 1 to which the position detection magnet is fixed, the thicknesses of the spacers SP1 to SP4 are decided such that the distance between the X-axis position detection magnet Mh1 and the X-axis position detection Hall element H1, the distance between the Y-axis rotation position detection magnet Mh2 and the Y-axis rotation position detection Hall element H2 and the distance between the Y-axis rotation position detection magnet Mh3 and the Y-axis rotation position detection Hall element H3 are have the design values based on the first to third distances measured in step S2 of FIG. 12 and the fourth distance to the sixth distance. By doing this, it is possible to further improve the position detection accuracy.

Although it has been described that the distance between the first support member 1A and the yoke 12 is adjusted by the spacers SP1 to SP4, the configuration for adjusting this distance is not limited to the spacers SP1 to SP4.

Figure 13:
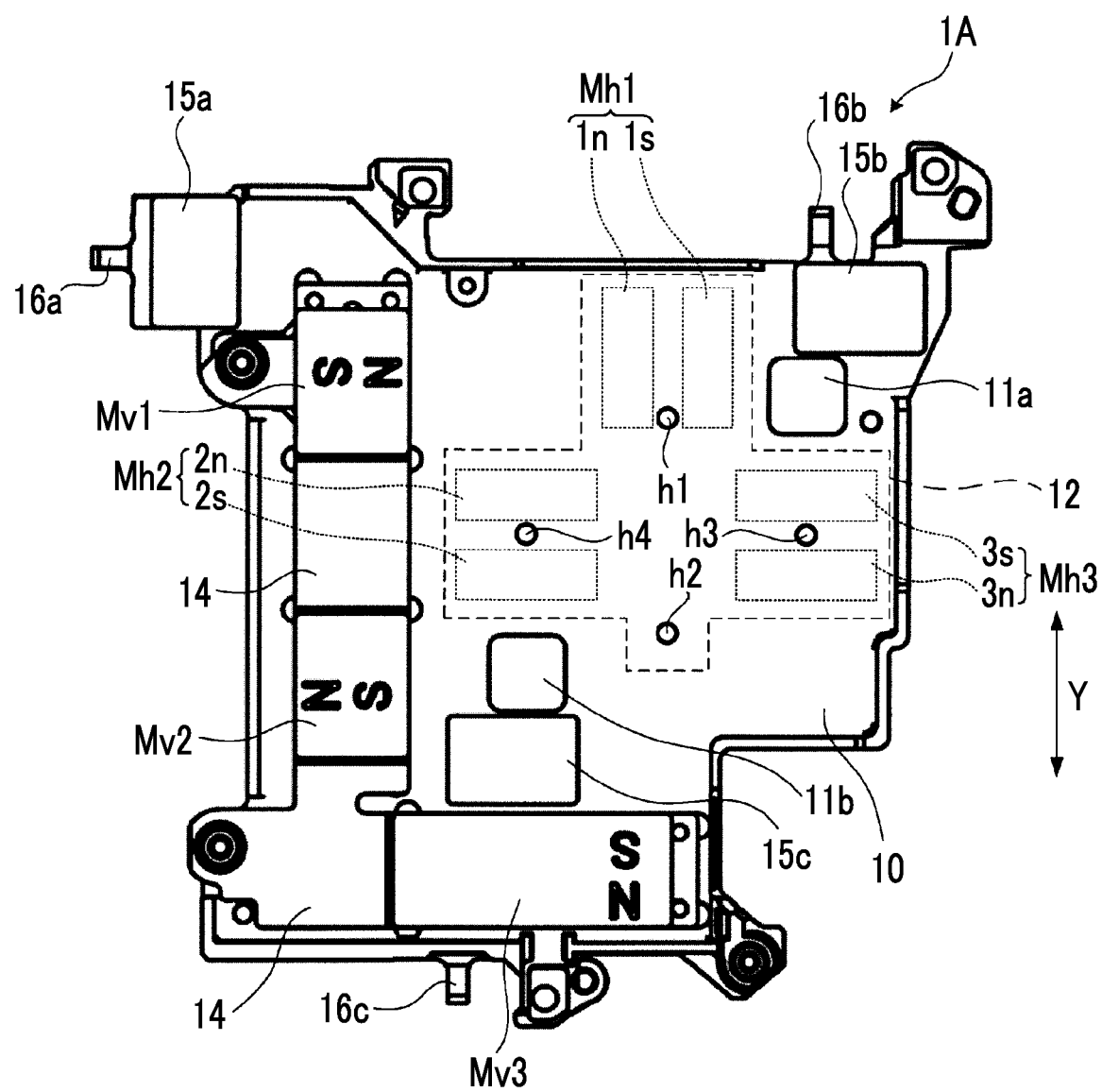
FIG. 13 is a diagram a modification example of the first support member 1A of the image shake correction device 3, and is a front view of the first support member 1A as viewed in the direction Z from the imaging optical system 101 side.

FIG. 13 is a diagram showing a modification example of the first support member 1A of the image shake correction device 3, and is a front view of the first support member 1A as viewed in the direction Z from the imaging optical system 101 side.

FIG. 13 shows a state in which the yoke 12 is removed from the first support member 1A. In FIG. 13, the yoke 12 and the position detection magnet are indicated by broken lines.

Figure 14:
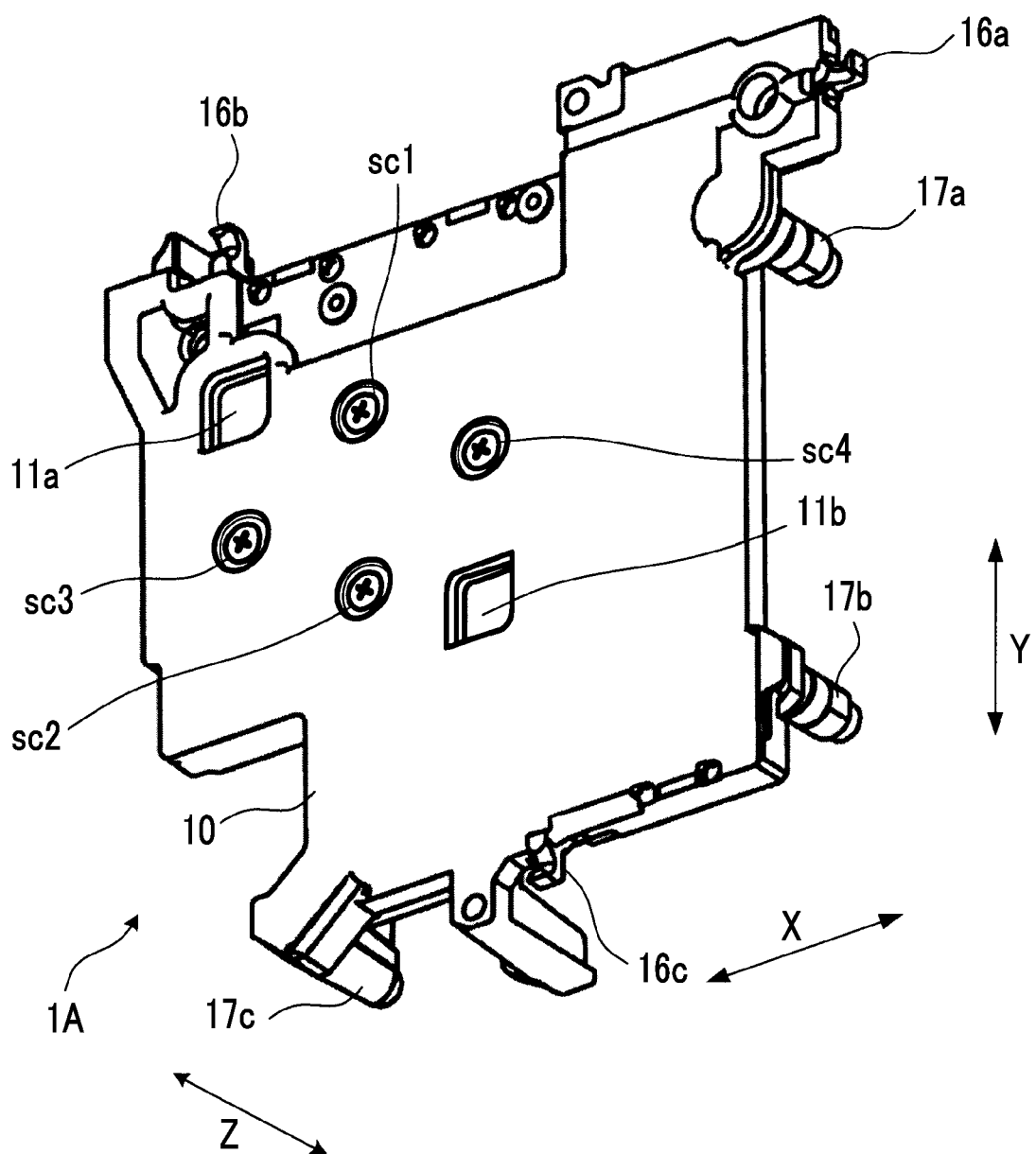
FIG. 14 is a perspective view of the first support member 1A shown in FIG. 13 as viewed from the side opposite to the imaging optical system 101.

FIG. 14 is a perspective view of the first support member 1A shown in FIG. 13 as viewed from a side opposite to the imaging optical system 101.

The first support member 1A of the modification example shown in FIGS. 13 and 14 has the same configuration as the configuration shown in FIGS. 5 and 6 except that the spacers SP1 to SP4 are removed, the screw holes are removed from the surface of the first support member 1A side of the yoke 12, the yoke 12 is fixed to the base 10 with an adhesive, and the screws sc1 to sc4 are inserted into the through-holes h1 to h4 instead of the screws SC1 to SC4.

The screw sc1 has a flat distal end surface, and at least a part of the distal end surface abuts on the yoke 12 in a state of being inserted into the through-hole h1.

The screw sc2 has a flat distal end surface, and at least a part of the distal end surface abuts on the yoke 12 in a state of being inserted into the through-hole h2.

The screw sc3 has a flat distal end surface, and at least a part of the distal end surface abuts on the yoke 12 in a state of being inserted into the through-hole h3.

The screw sc4 has a flat distal end surface, and at least a part of the distal end surface abuts on the yoke 12 in a state of being inserted into the through-hole h4.

The screws sc1 to sc4 constitute an insertion member.

In the image shake correction device 3 including the first support member 1A of this modification example, lengths of the portions of the screws sc1 to sc4 protruding from the through-holes h1 to h4 toward the yoke 12 are adjusted.

By this adjustment, the distances between the position detection magnets fixed to the yoke 12 and the position detectors fixed to the circuit board 21 are uniform.

Figure 15:
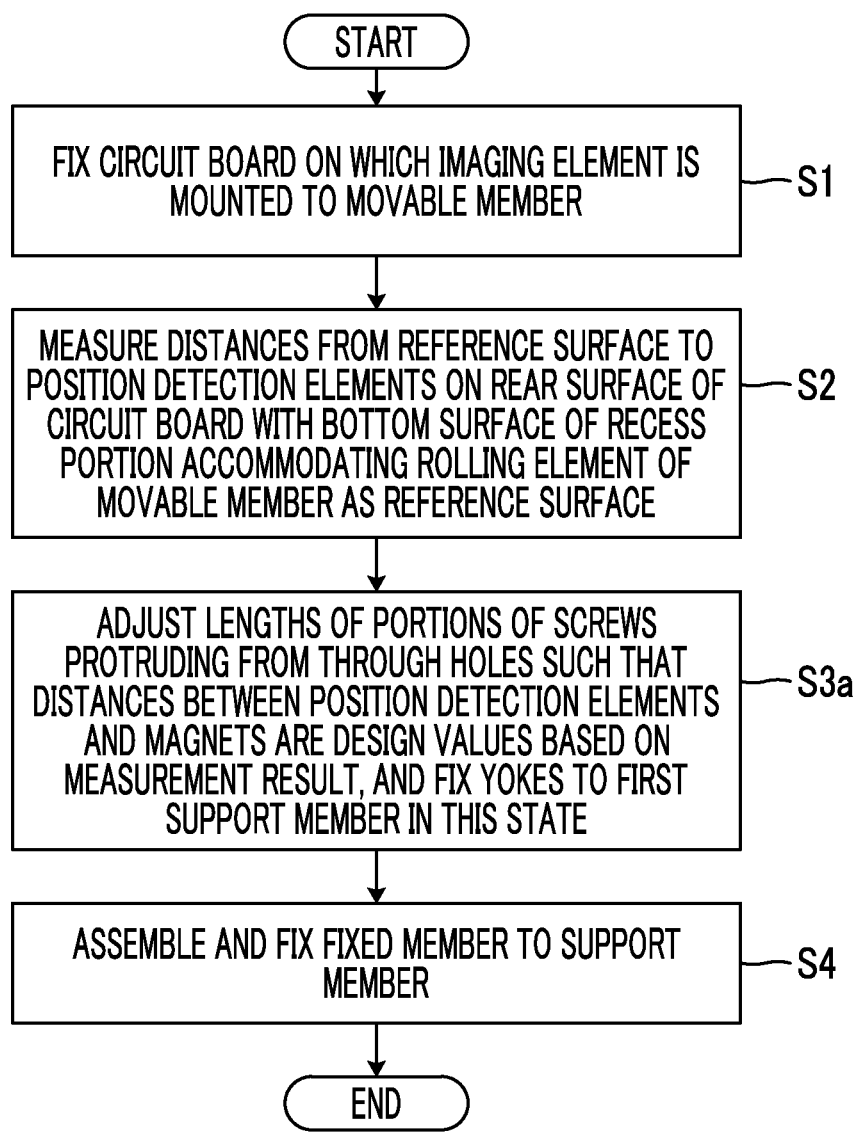
FIG. 15 is a flowchart for describing a method of manufacturing the image shake correction device 3 including the first support member 1A shown in FIGS. 13 and 14.

FIG. 15 is a flowchart for describing the manufacturing method of the image shake correction device 3 including the first support member 1A shown in FIGS. 13 and 14. FIG. 15 is the same as FIG. 12 except that step S3 is changed to step S3a. In FIG. 15, the same references are assigned to the same processing as the processing in FIG. 12, and thus, the description thereof will be omitted.

After step S2, in a case where the movable member 2 is assembled to the support member 1 to which the position detection magnet is fixed, the lengths of the portions of the screws sc1 to sc4 protruding from the through-holes h1 to h4 are decided based on the first distance, the second distance, and the third distance measured in step S2 such that the distance between the X-axis position detection magnet Mh1 and the X-axis position detection Hall element H1, the distance between the Y-axis rotation position detection magnet Mh2 and the Y-axis rotation position detection Hall element H2, and the distance between the Y-axis rotation position detection magnet Mh3 and the Y-axis rotation position detection Hall element H3 have predetermined design values.

Subsequently, the yoke 12 is temporarily fixed to the first support member 1A. The temporary fixing refers to a state in which the yoke 12 is supported by the first support member 1A in a state in which the yoke is movable in the direction Z and can be inclined with respect to any one of the flat surfaces 15a to 15c.

In the state of temporary fixing, the screws sc1 to sc4 are inserted into the through-holes h1 to h4 according to the decided lengths, and the lengths of the portions of the screws sc1 to sc4 are adjusted. After this adjustment, the yoke 12 is fixed to the base 10 with an adhesive (step S3a). Steps S2 and S3a of FIG. 15 constitute a second step.

By the step S3a, the rear surface of the circuit board 21 and the surface to which the position detection magnet of the yoke 12 is fixed are parallel, and the distance between the X-axis position detection magnet Mh1 and the X-axis position detection Hall element H1, the distance between the Y-axis rotation position detection magnet Mh2 and the Y-axis rotation position detection Hall element H2, and the distance between the Y-axis rotation position detection magnet Mh3 and the Y-axis rotation position detection Hall element H3 becomes uniform.

After step S3a, step S4 is performed.

In the flowchart shown in FIG. 15, the distances to the X-axis position detection magnet Mh1, the Y-axis rotation position detection magnet Mh2, and the Y-axis rotation position detection magnet Mh3 from any of the flat surfaces 15a to 15c are measured before step S3a, and in step S3a, the lengths of the portions of the screws sc1 to sc4 may be adjusted based on the distances and the distances measured in step S2.

According to the image shake correction device 3 including the first support member 1A shown in FIGS. 13 and 14, the distance between the X-axis position detection magnet Mh1 and the X-axis position detection Hall element H1, the distance between the Y-axis rotation position detection magnet Mh2 and the Y-axis rotation position detection Hall element H2, and the distance between the Y-axis rotation position detection magnet Mh3 and the Y-axis rotation position detection Hall element H3 are the same. Thus, the position detection accuracy of the movable member 2 can be improved.

In this modification example, the screws sc1 to sc4 function as adjustment members for adjusting the distance between the magnetic force generator including the position detection magnet and the yoke 12 and the first support member 1A.

Figure 16:
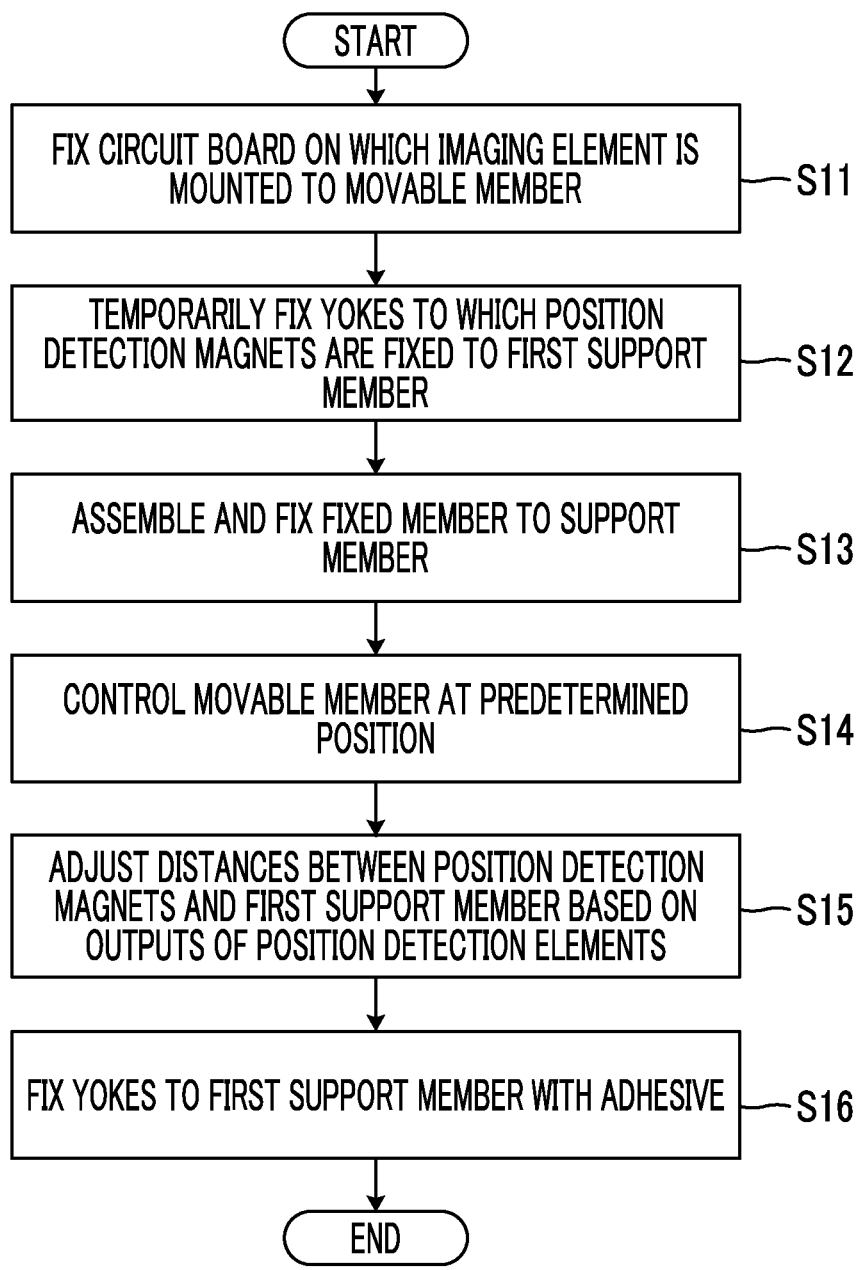
FIG. 16 is a flowchart for describing a modification example of the method of manufacturing the image shake correction device 3 including the first support member 1A shown in FIGS. 13 and 14.

FIG. 16 is a flowchart for describing a modification example of the manufacturing method of the image shake correction device 3 including the first support member 1A shown in FIGS. 13 and 14.

First, the support member 1 on which components other than the position detection magnet, the coupling member 13, and the yoke 12 are formed, and the movable member 2 on which components other than the circuit board 21 on which the imager 20 is mounted are prepared.

The circuit board 21 is fixed to the movable member 2 with an adhesive in a state in which any one of the bottom surfaces 29a to 29c of the movable member 2 and the light receiving surface 20a of the imager 20 are parallel (step S11). Step S11 constitutes a first step.

Subsequently, the yoke 12 to which the position detection magnet coupled by the coupling member 13 is fixed is temporarily fixed to the first support member 1A (step S12).

Subsequently, the first support member 1A and the second support member 1B are coupled in a state in which the flexible print substrates 25 to 27 are connected to the connectors 21a to 21c of the circuit board 21 and the balls are interposed between the recess portions 290a to 290c of the movable member 2 and the flat surfaces 15a to 15c of the first support member 1A. The movable member 2 is assembled to the support member 1 by locking the spring 24a to the hook 16a and the hook 23a, locking the spring 24b to the hook 16b and the hook 23b, and locking the spring 24c to the hook 16c and the hook 23c (step S13).

Subsequently, the flexible print substrates 25 to 27 are energized to drive the movable member 2, and the position of the movable member 2 is controlled to a predetermined position (step S14). For example, this predetermined position is a position in the reference state.

Subsequently, in a state in which the movable member 2 is at the predetermined position, the output signals of the X-axis position detection Hall element H1, the Y-axis rotation position detection Hall element H2, and the Y-axis rotation position detection Hall element H3 are acquired.

The distance between the position detection magnet and the base 10 of the first support member 1A is adjusted by adjusting the lengths of the portions of the screws sc1 to sc4 inserted into the through-holes h1 to h4 such that these output signals have values corresponding to the predetermined positions (step S15).

Steps S13 to S15 constitute a second step.

Finally, the image shake correction device 3 is completed by fixing the yoke 12 to the first support member 1A with an adhesive (step S16).

According to the aforementioned manufacturing method, it is possible to adjust the distance between the position detection magnet and the position detector with consideration for individual variations of the X-axis position detection Hall element H1, the Y-axis rotation position detection Hall element H2, and the Y-axis rotation position detection Hall element H3. Thus, it is possible to perform the position detection with higher accuracy.

Steps such as a step of measuring the distance from the reference surface to the position detector and a step of measuring the distance from the reference surface to the position detection magnet are not required. Thus, it is possible to reduce manufacturing cost by shortening the time required for adjusting the distance between the position detection magnet and the position detector.

As long as the position can be detected by a change of the magnetic field supplied from the magnet, a magnetic sensor other than the Hall element may be used as the position detector for detecting the position of the movable member 2 in the image shake correction device 3 described above.

Although the image shake correction device 3 described above is configured to detect the position of the movable member 2 in three directions by using three position detectors, the number of position detectors may be four or more in order to improve the position detection accuracy.

Although the image shake correction device 3 described above moves the movable member 2 in three directions, it is possible to perform image shake correction with high accuracy even in the image shake correction device 3 that moves the movable member 2 only in two directions of the direction X and the direction Y by adjusting the distance between the position detector and the position detection magnet by using the spacer or the screw described above.

Next, a configuration of a smartphone will be described as another embodiment of the imaging device of the present invention.

Figure 17:
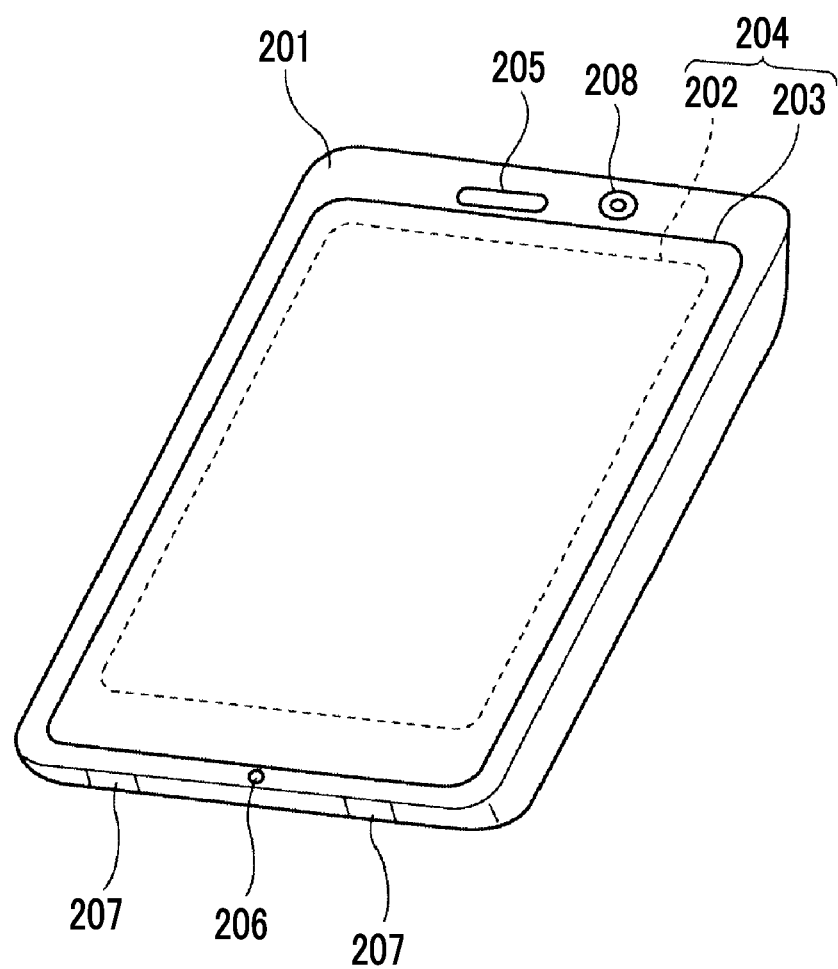
FIG. 17 shows an appearance of a smartphone 200 that is an embodiment of an imaging device of the present invention.

FIG. 17 shows an appearance of a smartphone 200 that is an embodiment of the imaging device of the present invention.

A smartphone 200 shown in FIG. 17 comprises a flat plate casing 201, and comprises a display input unit 204 in which a display panel 202 as a display surface and an operation panel 203 as an input unit are integrated on one surface of the casing 201.

Such a casing 201 comprises a speaker 205, a microphone 206, an operation unit 207, and a camera unit 208.

The configuration of the casing 201 is not limited thereto, and for example, a configuration in which the display surface and the input unit are independent can be employed, or a configuration having a folding structure or a slide mechanism can be employed.

Figure 18:
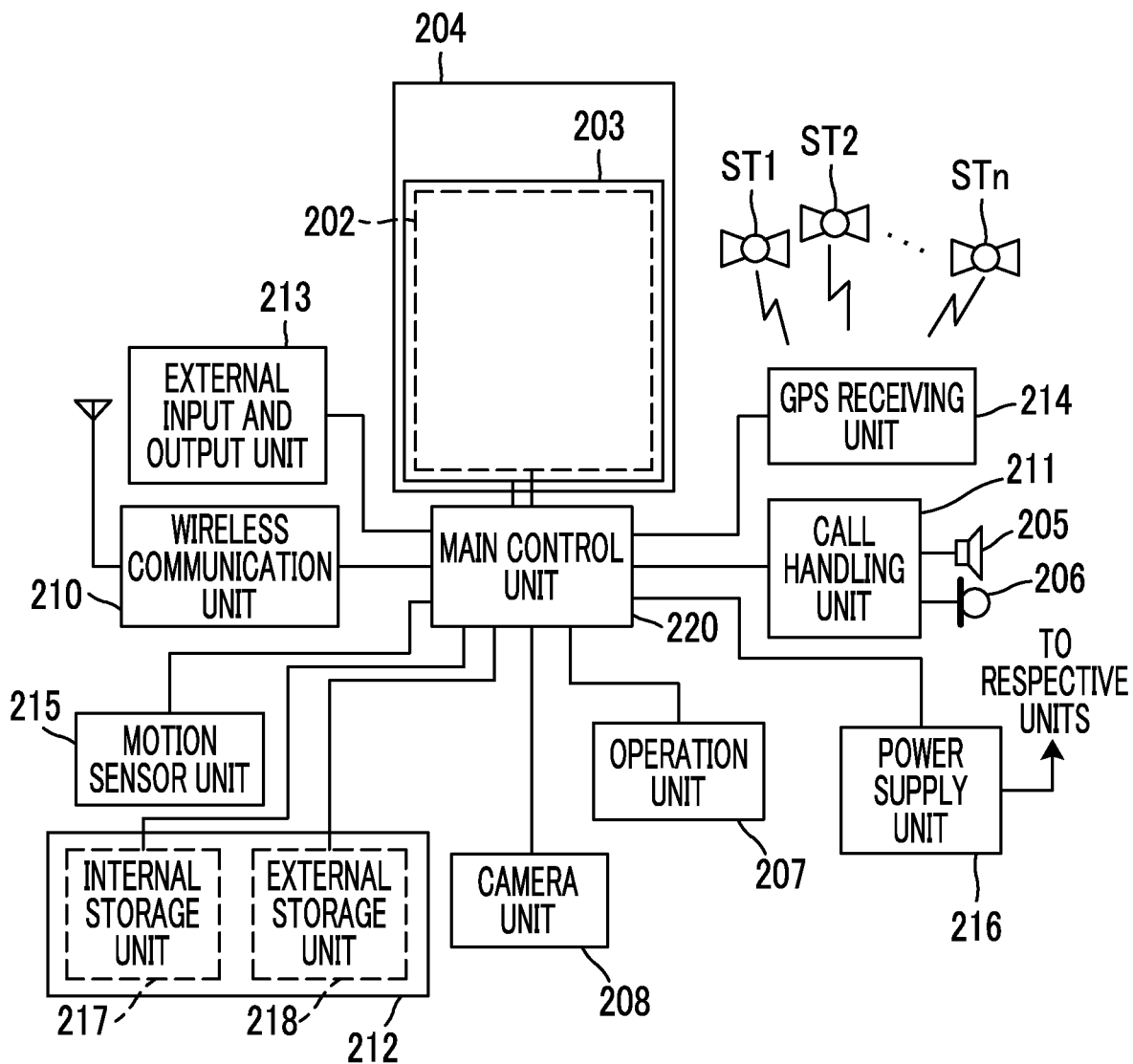
FIG. 18 is a block diagram showing a configuration of the smartphone 200 shown in FIG. 17.

FIG. 18 is a block diagram showing a configuration of the smartphone 200 shown in FIG. 17.

As shown in FIG. 18, the smartphone comprises, as main components, a wireless communication unit 210, the display input unit 204, a call handling unit 211, the operation unit 207, the camera unit 208, a storage unit 212, an external input and output unit 213, a Global Positioning System (GPS) receiving unit 214, a motion sensor unit 215, a power supply unit 216, and a main controller 220.

The smartphone 200 has, as a main function, a wireless communication function of performing mobile radio communication through a base station apparatus BS (not shown) and a mobile communication network NW (not shown).

The wireless communication unit 210 performs wireless communication with the base station apparatus BS belonging to the mobile communication network NW according to an instruction of the main controller 220. The transmission and reception of various file data such as voice data, image data, and e-mail data, and reception of Web data or streaming data are performed by using this wireless communication.

Under the control of the main controller 220, the display input unit 204 displays images (still images and moving images) or text information, and visually transmits the images and information to the user, and is a so-called touch panel that detects a user operation for the displayed information. The display input unit comprises the display panel 202 and the operation panel 203.

The display panel 202 uses, as a display device, a liquid crystal display (LCD) or an organic electro-luminescence display (OELD).

The operation panel 203 is a device that is mounted so as to visually recognize the image displayed on the display surface of the display panel 202, and detects one or a plurality of coordinates operated by a finger of the user or a stylus. In a case where this device is operated by the finger of the user or the stylus, a detection signal generated due to the operation is output to the main controller 220. Subsequently, the main controller 220 detects an operation position (coordinates) on the display panel 202 based on the received detection signal.

As shown in FIG. 18, although it has been described that the display panel 202 and the operation panel 203 of the smartphone 200 illustrated as the embodiment of the imaging device of the present invention are integrally formed and constitute the display input unit 204, the operation panel 203 is disposed so as to completely cover the display panel 202.

In a case where such an arrangement is adopted, the operation panel 203 may have a function of detecting the user operation even in a region outside the display panel 202. In other words, the operation panel 203 may have a detection region (hereinafter, referred to as a display region) for an overlapped portion which overlaps with the display panel 202 and a detection region (hereinafter, referred to as a non-display region) for an outer edge portion which does not overlap with the display panel 202.

The size of the display region and the size of the display panel 202 may completely match each other, and it is not necessary to match both the sizes.

The operation panel 203 may have the outer edge portion and two sensitive regions which are inner portions other than the outer edge. A width of the outer edge portion is appropriately designed according to the size of the casing 201.

Examples of the position detection method employed in the operation panel 203 include a matrix switch method, a resistive film method, a surface acoustic wave method, an infrared method, an electromagnetic induction method, and an electrostatic capacitance method.

The call handling unit 211 comprises the speaker 205 or the microphone 206, converts the voice of the user input through the microphone 206 into voice data capable of being processed by the main controller 220 to output the voice data to the main controller 220 or decodes the voice data received by the wireless communication unit 210 or the external input and output unit 213 to output the decoded voice data from the speaker 205.

For example, as shown in FIG. 17, the speaker 205 may be mounted on the same surface as the surface on which the display input unit 204 is provided, and the microphone 206 may be mounted on a side surface of the casing 201.

The operation unit 207 is a hardware key using a key switch, and receives an instruction from the user.

For example, as shown in FIG. 17, the operation unit 207 is a push button type switch which is mounted on a side surface of the casing 201 of the smartphone 200, and is turned on by being pressed with the finger and is turned off by a restoring force such as a spring in a case where the finger is released.

The storage unit 212 stores a control program and control data of the main controller 220, application software, address data associated with a name or a telephone number of a communication partner, the transmitted and received e-mail data, Web data downloaded by Web browsing, and download content data, and temporarily stores streaming data. The storage unit 212 includes an internal storage unit 217 built in the smartphone and an external storage unit 218 having a slot for a removable external memory.

The internal storage unit 217 and the external storage unit 218 constituting the storage unit 212 is realized by using a storage medium such as a memory (for example, MicroSD (registered trademark) memory) of a flash memory type, a hard disk type, a multimedia card micro type, or a card type, a random access memory (RAM), or a read only memory (ROM).

The external input and output unit 213 serves as an interface with all external devices coupled to the smartphone 200, and directly or indirectly communicates with other external devices by (for example, universal serial bus (USB) or IEEE 1394) or a network (for example, Internet, wireless LAN, Bluetooth (registered trademark), radio frequency identification (RFID), Infrared Data Association (IrDA) (registered trademark), ultra wideband (UWB) (registered trademark), or ZigBee (registered trademark)).

Examples of the external device to be connected to the smartphone 200 includes a wired or wireless headset, an external wired or wireless charger, a wired or wireless data port, a memory card to be connected through a card socket, subscriber identity module (SIM)/user identity module (UIM) card, or an external audio and video device to be connected through an audio and video input and output (I/O) terminal, an external audio and video device to be connected in a wireless manner, a smartphone to be connected in a wired or wireless manner, a personal computer to be connected in a wired or wireless manner, or an earphone to be connected in a wired or wireless manner.

The external input and output unit 213 can transfer data transmitted from the external devices to the components in the smartphone 200 or can transmit data in the smartphone 200 to the external devices.

The GPS receiving unit 214 receives GPS signals transmitted from GPS satellites ST1 to STn according to an instruction of the main controller 220, performs positioning calculation processing based on a plurality of received GPS signals, and detects the position of the smartphone 200 having latitude, longitude, and altitude.

In a case where positional information can be acquired from the wireless communication unit 210 or the external input and output unit 213 (for example, a wireless LAN), the GPS receiving unit 214 can detect the position by using the positional information.

For example, the motion sensor unit 215 comprises a three-axis acceleration sensor, and detects physical motion of the smartphone 200 according to an instruction of the main controller 220.

The movement direction or acceleration of the smartphone 200 is detected by detecting the physical motion of the smartphone 200. The detection result is output to the main controller 220.

The power supply unit 216 supplies power stored in a battery (not shown) to the respective units of the smartphone 200 according to an instruction of the main controller 220.

The main controller 220 comprises a microprocessor, operates according to the control program or control data stored in the storage unit 212, and integrally controls the units of the smartphone 200.

The main controller 220 has a mobile communication control function of controlling the units of a communication system in order to perform voice communication or data communication through the wireless communication unit 210, and an application processing function.

The application processing function is realized by the main controller 220 operating according to application software stored in the storage unit 212.

The application processing function is, for example, an infrared communication function of controlling the external input and output unit 213 to perform data communication with a device facing the smartphone, an electronic mail function of transmitting and receiving electronic mails, or a Web browsing function of browsing Web pages.

The main controller 220 has an image processing function of displaying video on the display input unit 204 based on image data (still image or moving image data), such as received data or downloaded streaming data.

The image processing function refers to a function of the main controller 220 decoding the image data, performing image processing on the decoding result, and displaying an image on the display input unit 204.

The main controller 220 performs display control on the display panel 202 and operation detection control for detecting a user operation through the operation unit 207 and the operation panel 203.

Through the performing of the display control, the main controller 220 displays an icon for activating application software or a software key, such as a scroll bar, or displays a window for creating electronic mails.

The scroll bar refers to a software key for receiving an instruction to move a display portion of an image which is too large to fit into the display region of the display panel 202.

Through the performing of the operation detection control, the main controller 220 detects the user operation through the operation unit 207, receives an operation on the icon or an input of a character string in an input field of the window through the operation panel 203, or receives a scroll request of a display image through the scroll bar.

Through the performing of the operation detection control, the main controller 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation.

The gesture operation is not a conventional simple touch operation, but means an operation to render a track with a finger, an operation to simultaneously designate a plurality of positions, or an operation to render a track for at least one of a plurality of positions by combining the above-described operations.

The camera unit 208 includes components other than the motion detection sensor 106, the system controller 108, and the image processing unit 107 of the digital camera 100 shown in FIG. 1.

In the smartphone 200, the main controller 220 controls the image shake correction device 3 based on information from the motion sensor unit 215 corresponding to the motion detection sensor 106 to perform image shake correction.

Captured image data generated by the camera unit 208 can be recorded in the storage unit 212 or can be output through the external input and output unit 213 or the wireless communication unit 210.

Although it has been described in the smartphone 200 shown in FIG. 17 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS receiving unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a moving image may be attached with positional information acquired by the GPS receiving unit 214, voice information (which may be converted to text information through voice-text conversion by the main controller) acquired by the microphone 206, or posture information acquired by the motion sensor unit 215 and can be recorded in the storage unit 212, or may be output through the external input and output unit 213 or the wireless communication unit 210.

In the smartphone 200 having the aforementioned configuration, the image shake correction device 3 has the aforementioned configuration, and thus, it is possible to perform the image shake correction with high accuracy.

As described above, the following items are disclosed in this specification.

(1) There is provided an image shake correction device comprises a movable member, a support member that supports the movable member to be movable in a plurality of directions along a flat surface, a circuit board that is fixed to the movable member, an imager that is mounted on the circuit board, a plurality of position detectors that is fixed to a rear surface of the circuit board opposite to a surface of the circuit board on which the imager is mounted to detect a position of the movable member in a movement direction of the movable member, magnetic force generators that face the plurality of position detectors respectively and are fixed to the support member, and adjustment members that adjust distances between the magnetic force generators and the support member.

(2) In the image shake correction device according to (1), the adjustment members are spacers arranged between the magnetic force generators and the support member.

(3) In the image shake correction device according to (1), the support member includes through-holes at portions facing the magnetic force generators, the adjustment members include insertion members inserted into the through-holes, and the distances are adjusted by lengths of portions of the insertion members protruding from the through-holes toward the magnetic force generators.

(4) In the image shake correction device according to any one of (1) to (3), the magnetic force generators include a magnet, and a yoke provided between the magnet and the support member, and the yokes of all of the magnetic force generators fixed to the support member are integrated.

(5) In the image shake correction device according to any one of (1) to (4), the plurality of directions is a first direction which is a longitudinal direction of a light receiving surface of the imager, a second direction which is a short direction of the light receiving surface of the imager, and a third direction along a circumferential direction of a circle whose center is a center of the light receiving surface of the imager, and the plurality of position detectors is at least three position detectors that detect a position of the movable member in the first direction, a position of the movable member in the second direction, and a position of the movable member in the third direction.

(6) In the image shake correction device according to (5), the plurality of position detectors includes a first position detector and a second position detector arranged in the longitudinal direction of the light receiving surface of the imager, and the position of the movable member in the third direction is detected based on an output of the first position detector and an output of the second position detector.

(7) An imaging device comprises the image shake correction device according to any one of (1) to (6).

(8) There is provided a method of manufacturing an image shake correction device that includes a movable member, a support member which movably supports the movable member to be movable in a plurality of directions along a flat surface, a circuit board which is fixed to the movable member, an imager which is mounted on the circuit board, a plurality of position detectors which is fixed to a rear surface of the circuit board opposite to a surface of the circuit board on which the imager is mounted to detect a position of the movable member in a movement direction of the movable member, and magnetic force generators which face the plurality of position detectors respectively and are fixed to the support member. The method comprises a first step of fixing the circuit board to the movable member in a state in which a light receiving surface of the imager is parallel to the flat surface, and a second step of adjusting distances between the magnetic force generators and the support member, and fixing the magnetic force generators to the support member in a state in which the adjusted distances are maintained after the first step.

(9) In the method of manufacturing an image shake correction device according to (8), in the second step, intervals between the position detectors and the magnetic force generators are uniformized by measuring distances from a reference surface horizontal to the flat surface which is set in the movable member to the position detectors and adjusting the distances between the magnetic force generators and the support member based on the measured distances.

(10) In the method of manufacturing an image shake correction device according to (8), in the second step, the movable member is controlled to a predetermined position in a state in which the movable member is assembled to the support member to which the magnetic force generators are temporarily fixed, the distances between the magnetic force generators and the support member are adjusted based on outputs of the position detectors in a state in which the movable member is controlled to the position, and the outputs of the position detectors are adjusted to a value corresponding to the position.

(11) In the method of manufacturing an image shake correction device according to (8) or (9), in the second step, the distances are adjusted by changing thicknesses of spacers arranged between the magnetic force generators and the support member.

(12) In the method of manufacturing an image shake correction device according to any one of (8) to (10), the support member includes through-holes at portions facing the magnetic force generators, and in the second step, the distances are adjusted by changing lengths of portions of insertion members inserted into the through-holes which protrude from the through-holes toward the magnetic force generators.

(13) In the method of manufacturing an image shake correction device according to any one of (8) to (12), the magnetic force generators include a magnet, and a yoke provided between the magnet and the support member, and the yokes of all of the magnetic force generators fixed to the support member are integrated.

(14) In the method of manufacturing an image shake correction device according to any one of (8) to (13), the plurality of directions is a first direction which is a longitudinal direction of a light receiving surface of the imager, a second direction which is a short direction of the light receiving surface of the imager, and a third direction along a circumferential direction of a circle whose center is a center of the light receiving surface of the imager, and the plurality of position detectors is at least three position detectors that detect a position of the movable member in the first direction, a position of the movable member in the second direction, and a position of the movable member in the third direction.

(15) In the method of manufacturing an image shake correction device according to (14), the plurality of position detectors includes a first position detector and a second position detector arranged in the longitudinal direction of the light receiving surface of the imager, and the position of the movable member in the third direction is detected based on an output of the first position detector and an output of the second position detector.

The present invention is highly convenient and effective by being applied to a digital camera such as a single-lens reflex camera or a mirrorless camera, an in-vehicle camera, a surveillance camera, or a smartphone.

Although the present invention has been described in conjunction with the specific embodiments, the present invention is not limited to these embodiments, and can be variously changed without departing from the technical idea of the disclosed invention.

This application is based on Japanese Patent Application (JP2017-186873) filed Sep. 27, 2017, the content of which is incorporated herein.

EXPLANATION OF REFERENCES

100: digital camera
101: imaging optical system
20: imager
3: image shake correction device
104: AFE
105: imager drive unit
106: motion detection sensor
108: system controller
107: image processing unit
K: optical axis
1: support member
1A: first support member
Mh1: X-axis position detection magnet
Mh2: Y-axis rotation position detection magnet
Mh3: Y-axis rotation position detection magnet
1s, 2s, 3s: S-pole
1n, 2n, 3n: N-pole
Mv1: X-axis rotation drive magnet
Mv2: X-axis rotation drive magnet
Mv3: Y-axis drive magnet
1B: second support member
mv1: X-axis rotation drive magnet
mv2: X-axis rotation drive magnet
mv3: Y-axis drive magnet
2: movable member
C1: X-axis rotation drive coil
C2: X-axis rotation drive coil
C3: Y-axis drive coil
21: circuit board
H1: X-axis position detection Hall element
H2: Y-axis rotation position detection Hall element
H3: Y-axis rotation position detection Hall element
24a, 24b, 24c: spring
20a: light receiving surface
P: center of light receiving surface
R: rotation axis
10: base
11a, 11b: through-hole
12, 14: yoke
13: coupling member
15a, 15b, 15c: flat surface
16a, 16b, 16c: hook
17a, 17b, 17c: projecting portion
18: yoke
19a: hole portion
19b, 19c: notch portion
h1, h2, h3, h4: through-hole
SP1, SP2, SP3, SP4: spacer
SC1, SC2, SC3, SC4: screw
sc1, sc2, sc3, sc4: screw (insertion member)
21a, 21b, 21c: connector
22: base
23a, 23b, 23c: hook
25, 26, 27: flexible print substrate
25a, 26a: first portion
270: second portion
25b, 26b, 271: folded portion
27a: fixed portion
27b: non-fixed portion
28A, 28A: attachment portion
28a, 28b: insertion member
280a, 280b: flat plate portion
29a, 29b, 29c: bottom surface
290a, 290b, 290c: recess portion
200: smartphone
201: casing
202: display panel
203: operation panel
204: display input unit
205: speaker
206: microphone
207: operation unit
208: camera unit
210: wireless communication unit
211: call handling unit
212: storage unit
213: external input and output unit
214: GPS receiving unit
215: motion sensor unit
216: power supply unit
217: internal storage unit
218: external storage unit
220: main controller
ST1 to STn: GPS satellites

What is claimed is:

1. An image shake correction device comprising:
a movable member;
a support member that supports the movable member to be movable in a plurality of directions along a flat surface;
a circuit board that is fixed to the movable member;
an imager that is mounted on the circuit board;
a plurality of position detectors that are fixed to a rear surface of the circuit board opposite to a surface of the circuit board on which the imager is mounted to detect a position of the movable member in a movement direction of the movable member;
magnetic force generators that face the plurality of position detectors respectively and are fixed to the support member; and
adjustment members that adjust distances between the magnetic force generators and the support member,
wherein the movable member is movable relative to the support member in a plurality of nonlinear directions along a flat surface.

2. The image shake correction device according to claim 1,
wherein the adjustment members are spacers arranged between the magnetic force generators and the support member.

3. The image shake correction device according to claim 1,
wherein the support member includes through-holes at portions facing the magnetic force generators,
the adjustment members include insertion members inserted into the through-holes, and
the distances are adjusted by lengths of portions of the insertion members protruding from the through-holes toward the magnetic force generators.

4. The image shake correction device according to claim 1,
wherein the magnetic force generators include a magnet, and a yoke provided between the magnet and the support member, and
the yokes of all of the magnetic force generators fixed to the support member are integrated.

5. The image shake correction device according to claim 1,
wherein the plurality of directions is a first direction which is a longitudinal direction of a light receiving surface of the imager, a second direction which is a short direction of the light receiving surface of the imager, and a third direction along a circumferential direction of a circle whose center is a center of the light receiving surface of the imager, and
the plurality of position detectors is at least three position detectors that detect a position of the movable member in the first direction, a position of the movable member in the second direction, and a position of the movable member in the third direction.

6. The image shake correction device according to claim 5,
wherein the plurality of position detectors includes a first position detector and a second position detector arranged in the longitudinal direction of the light receiving surface of the imager, and
the position of the movable member in the third direction is detected based on an output of the first position detector and an output of the second position detector.

7. An imaging device comprising the image shake correction device according to claim 1.

8. The image shake correction device according to claim 2,
wherein the spacers are arranged between the magnetic force generators and the support member along a plane.

9. The image shake correction device according to claim 1,
wherein the adjustment members are adjustable by the image shake correction device to change the distances between the magnetic force generators and the support member.

* * * * *